US010031375B2

(12) United States Patent
Joo et al.

(10) Patent No.: US 10,031,375 B2
(45) Date of Patent: Jul. 24, 2018

(54) DISPLAY DEVICE HAVING MORE RELIABLE IMAGE DISPLAY

(71) Applicant: SAMSUNG DISPLAY CO., LTD., Yongin-si, Gyeonggi-do (KR)

(72) Inventors: Sun Kyu Joo, Suwon-si (KR); Jang Wi Ryu, Seoul (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 103 days.

(21) Appl. No.: 15/165,300

(22) Filed: May 26, 2016

(65) Prior Publication Data

US 2017/0038629 A1 Feb. 9, 2017

(30) Foreign Application Priority Data

Aug. 6, 2015 (KR) .................. 10-2015-0111045

(51) Int. Cl.
*G02F 1/1362* (2006.01)
*G02F 1/1339* (2006.01)
(Continued)

(52) U.S. Cl.
CPC .... *G02F 1/13394* (2013.01); *G02F 1/136209* (2013.01); *G02F 1/1335* (2013.01); *G02F 1/136227* (2013.01); *G02F 2001/13398* (2013.01); *G02F 2001/134345* (2013.01); *G02F 2001/136222* (2013.01)

(58) Field of Classification Search
CPC ....... G02F 1/13394; G02F 2001/13398; G02F 1/136209; G02F 1/133512; G02F 1/136286; G02F 2001/136222; G02F 2001/134345
See application file for complete search history.

(56) References Cited

U.S. PATENT DOCUMENTS

2011/0216276 A1* 9/2011 Yang .................. G02F 1/1335
349/108
2012/0038867 A1* 2/2012 Kwon .............. G02F 1/133512
349/110
(Continued)

FOREIGN PATENT DOCUMENTS

KR 10-2013-0137457 A 12/2013
KR 10-2015-0039002 A 4/2015
(Continued)

*Primary Examiner* — Jia Pan
(74) *Attorney, Agent, or Firm* — Innovation Counsel LLP

(57) ABSTRACT

A display device array substrate includes first and second light blocking regions, a first insulation layer disposed on the first light blocking region, a second insulation layer disposed on the second light blocking region, a light blocking member including a first part disposed on the first light blocking region and the first insulation layer, a second part disposed on the second light blocking region and the second insulation layer, and a third part disposed on a boundary between the first and second light blocking regions. A minimum height from an upper surface of the first insulation substrate to an upper surface of the third part is lower than a minimum height from the upper surface of the first insulation substrate to an upper surface of the first part and a minimum height from the upper surface of the first insulation substrate to an upper surface of the second part.

15 Claims, 21 Drawing Sheets

(51) Int. Cl.
*G02F 1/1335* (2006.01)
*G02F 1/1343* (2006.01)

(56) References Cited

U.S. PATENT DOCUMENTS

| | | | | |
|---|---|---|---|---|
| 2012/0249940 A1* | 10/2012 | Choi | ................ | G02F 1/133753 349/123 |
| 2015/0092138 A1* | 4/2015 | Kwak | ............... | G02F 1/133512 349/85 |
| 2015/0103296 A1* | 4/2015 | Kwak | ............... | G02F 1/134309 349/106 |
| 2016/0357042 A1 | 12/2016 | Yoon et al. | | |

FOREIGN PATENT DOCUMENTS

| KR | 10-2015-0043097 A | 4/2015 |
|---|---|---|
| KR | 10-2016-0142465 | 12/2016 |

* cited by examiner

DISPLAY DEVICE HAVING MORE RELIABLE IMAGE DISPLAY

CROSS-REFERENCE TO RELATED APPLICATION

This application claims priority from Korean Patent Application No. 10-2015-0111045 filed on Aug. 6, 2015 in the Korean Intellectual Property Office, the disclosure of which is incorporated herein by reference in its entirety.

BACKGROUND

1. Technical Field

Embodiments of the present inventive concept relate generally to flat panel displays. More specifically, embodiments of the present inventive concept relate to a flat panel display device having more reliable image display.

2. Description of the Related Art

A liquid crystal display device is one of the currently most widely used flat panel display devices, and may include two substrates facing each other with a liquid crystal layer interposed between the two substrates. Since the thickness of the liquid crystal layer may affect transmittance of light which passes through the liquid crystal layer, a spacer member may be interposed between the two substrates so as to maintain a uniform gap between the two substrates.

When a force from an external source is applied to the liquid crystal display device, the spacer member may be deformed to cause a change in the gap between the two substrates, which in turn may lead to a change in the light transmittance of the liquid crystal layer.

SUMMARY

Aspects of the present inventive concept provide a display device with improved reliability.

However, embodiments of the present inventive concept are not restricted to those set forth herein. Other embodiments of the present inventive concept which are not mentioned herein will become more apparent to a person skilled in the art to which the present inventive concept pertains by referencing the detailed description of the present inventive concept given below.

According to an aspect of the present inventive concept, there is provided a display device. The display device includes: an array substrate; a counterpart substrate facing the array substrate; and a liquid crystal layer interposed between the array substrate and the counterpart substrate. The array substrate includes: a first insulation substrate including a first pixel region having a first light blocking region, and a second pixel region disposed adjacent to the first pixel region in a first direction and having a second light blocking region; a first insulation layer disposed on the first light blocking region of the first insulation substrate; a second insulation layer disposed on the second light blocking region of the first insulation substrate; a light blocking member including a first part disposed on the first light blocking region of the first insulation substrate and on the first insulation layer, a second part disposed on the second light blocking region of the first insulation substrate and on the second insulation layer, and a third part disposed on a boundary between the first light blocking region of the first insulation substrate and the second light blocking region of the first insulation substrate, the third part being connected to the first part and the second part; and a spacer member disposed on the light blocking member and contacting the counterpart substrate. A minimum height from an upper surface of the first insulation substrate to an upper surface of the third part is lower than a minimum height from the upper surface of the first insulation substrate to an upper surface of the first part and lower than a minimum height from the upper surface of the first insulation substrate to an upper surface of the second part.

According to another aspect of the present inventive concept, there is provided a display device. The display device includes: an array substrate; a counterpart substrate facing the array substrate; and a liquid crystal layer interposed between the array substrate and the counterpart substrate. The array substrate includes a first insulation substrate having a first pixel region having a first light blocking region, and a second pixel region disposed adjacent to the first pixel region in a first direction and having a second light blocking region; the counterpart substrate includes: a second insulation substrate; a light blocking member disposed on the second insulation substrate facing the array substrate and overlapping the first light blocking region and the second light blocking region; and a spacer member which is disposed on the light blocking member and which contacts the array substrate. The light blocking member includes a first part, a second part different from the first part, and a third part different from the first part and the second part. A minimum height from one surface of the second insulation substrate to an upper surface of the third part is lower than a minimum height from the one surface of the second insulation substrate to an upper surface of the first part and lower than a minimum height from the one surface of the second insulation substrate to an upper surface of the second part.

Specific features of the embodiments are included in the detailed description and drawings.

The embodiments of the present inventive concept may at least provide effects described as follows.

That is, a display device with improved reliability may be provided.

However, effects of the present inventive concept are not restricted to the exemplary embodiments set forth herein and more diverse effects are included in this description.

DETAILED DESCRIPTION OF THE EMBODIMENTS

Figure 1:
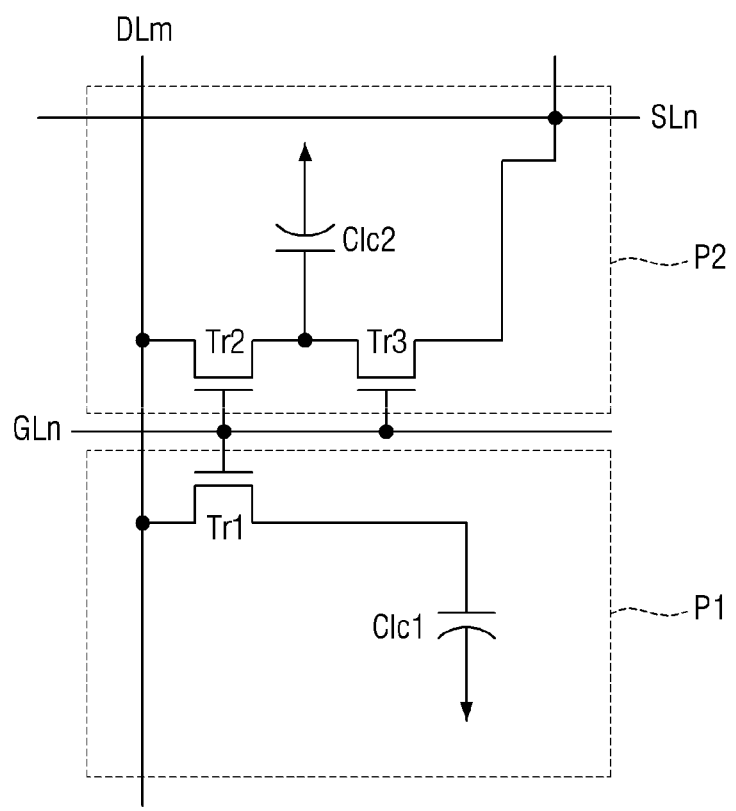
FIG. 1 is a circuit diagram illustrating an equivalent circuit of one pixel of a display device according to an embodiment of the present inventive concept.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The various Figures are not necessarily to scale. All numerical values are approximate, and may vary. All examples of specific materials and compositions are to be taken as nonlimiting and exemplary only. Other suitable materials and compositions may be used instead.

Embodiments set forth herein are described in the specification and depicted in the drawing in terms of an exemplary vertical alignment mode or patterned vertical alignment mode display device, but the present disclosure is not limited thereto. The present inventive concept may be applied to various display devices such as an in-plane switching (IPS) mode display device, a plane-line switching (PLS) mode display device, a fringe-field switching (FFS) mode display device, a twisted nematic (TN) mode display device and an electrically-controlled birefringence (ECB) mode display device.

Furthermore, embodiments set forth herein are described in the specification and depicted in the drawings in terms of a display device having a top common electrode configuration, but the present disclosure is not limited thereto. The present inventive concept may, for example, be applied to a display device having a bottom common electrode configuration.

Embodiments of the present inventive concept will hereinafter be explained with reference to the drawings.

FIG. 1 is a circuit diagram illustrating an equivalent circuit of one pixel of a display device according to an embodiment of the present inventive concept.

Referring to FIG. 1, one pixel of the display device according to an embodiment of the present inventive concept may include two subpixels P1 and P2. Furthermore, one pixel of the display device according to an embodiment of the present inventive concept may include a gate line GLn for transmitting a gate signal, a data line DLm for transmitting a data voltage, a sustain electrode line SLn for applying a constant sustain voltage Vc, and a first thin film transistor Tr1, a second thin film transistor Tr2 and a third thin film transistor Tr3.

The first thin film transistor Tr1 and the second thin film transistor Tr2 may be connected to the same gate line GLn and same data line DLm. Furthermore, the third thin film transistor Tr3 may be connected to the gate line GLn like the first thin film transistor Tr1 and the second thin film transistor Tr2, and to the second thin film transistor Tr2 and the sustain electrode line SLn.

One pixel may include two subpixels P1 and P2, and the first subpixel P1 may include a first liquid crystal capacitor Clc1 connected to the first thin film transistor Tr1 and the second subpixel P2 may include a second liquid crystal capacitor Clc2 connected to the second thin film transistor Tr2.

The first thin film transistor Tr1 may be included in the first subpixel P1, and the second and third thin film transistors Tr2 and Tr3 may be included in the second subpixel P2.

The first thin film transistor Tr1 may have a first terminal connected to the gate line GLn, a second terminal connected to the first data line DLm, and a third terminal connected to the first liquid crystal capacitor Clc1.

Specifically, the third terminal of the first thin film transistor Tr1 may be connected to a first subpixel electrode (not shown in the drawing) of the first liquid crystal capacitor Clc1.

The second thin film transistor Tr2 may have a first terminal connected to the gate line GLn, a second terminal connected to the first data line DLm, and a third terminal connected to the second liquid crystal capacitor Clc2.

Specifically, the third terminal of the second thin film transistor Tr2 may be connected to a second subpixel electrode (not shown in the drawing) of the second liquid crystal capacitor Clc2.

The third thin film transistor Tr3 may have a first terminal connected to the gate line GLn, a second terminal connected to the sustain electrode line SLn, and a third terminal connected to the third terminal of the second thin film transistor Tr2.

The display device according to an exemplary embodiment of the present inventive concept may operate as follows. When a gate on voltage is applied to the gate line GLm, each of the first, the second and the third thin film transistors Tr1, Tr2 and Tr3 are turned on, and the first liquid crystal capacitor Clc1 and the second liquid crystal capacitor Clc2 may be charged with the data voltage transmitted through the first data line DLm. In this case, the data voltage applied to the first subpixel electrode and the second subpixel electrode are identical with each other, and the first liquid crystal capacitor Clc1 and the second liquid crystal capacitor Clc2 may be charged by the same voltage value, which is a difference between a common voltage Vcom and the data voltage.

When the third thin film transistor Tr3 is turned on, the data voltage transmitted to the second subpixel P2 through the first data line DLm may be divided through the third thin film transistor Tr3 connected in series with the second thin film transistor Tr2. In this case, the voltage may be distributed based on the size of channels of the second thin film transistor Tr2 and the third thin film transistor Tr3. Thus, even when the data voltages transmitted to the first subpixel P1 and the second subpixel P2 through the first data line DLm are the same, the voltages charged in the first liquid crystal capacitor Clc1 and the second liquid crystal capacitor Clc2 may be different from each other. That is, the voltage charged in the second liquid crystal capacitor Clc2 may be lower than the voltage charged in the first liquid crystal capacitor Clc1.

Consequently, the voltages charged in the first subpixel P1 and the second subpixel P2 of one pixel may be different from each other, thereby improving side visibility. The sustain voltage Vc may have a level higher than the level of the common voltage Vcom. For example, when the common voltage Vcom is approximately 7V, the sustain voltage Vc may be approximately 8V to 11V, but the present disclosure is not limited thereto.

Figure 2:
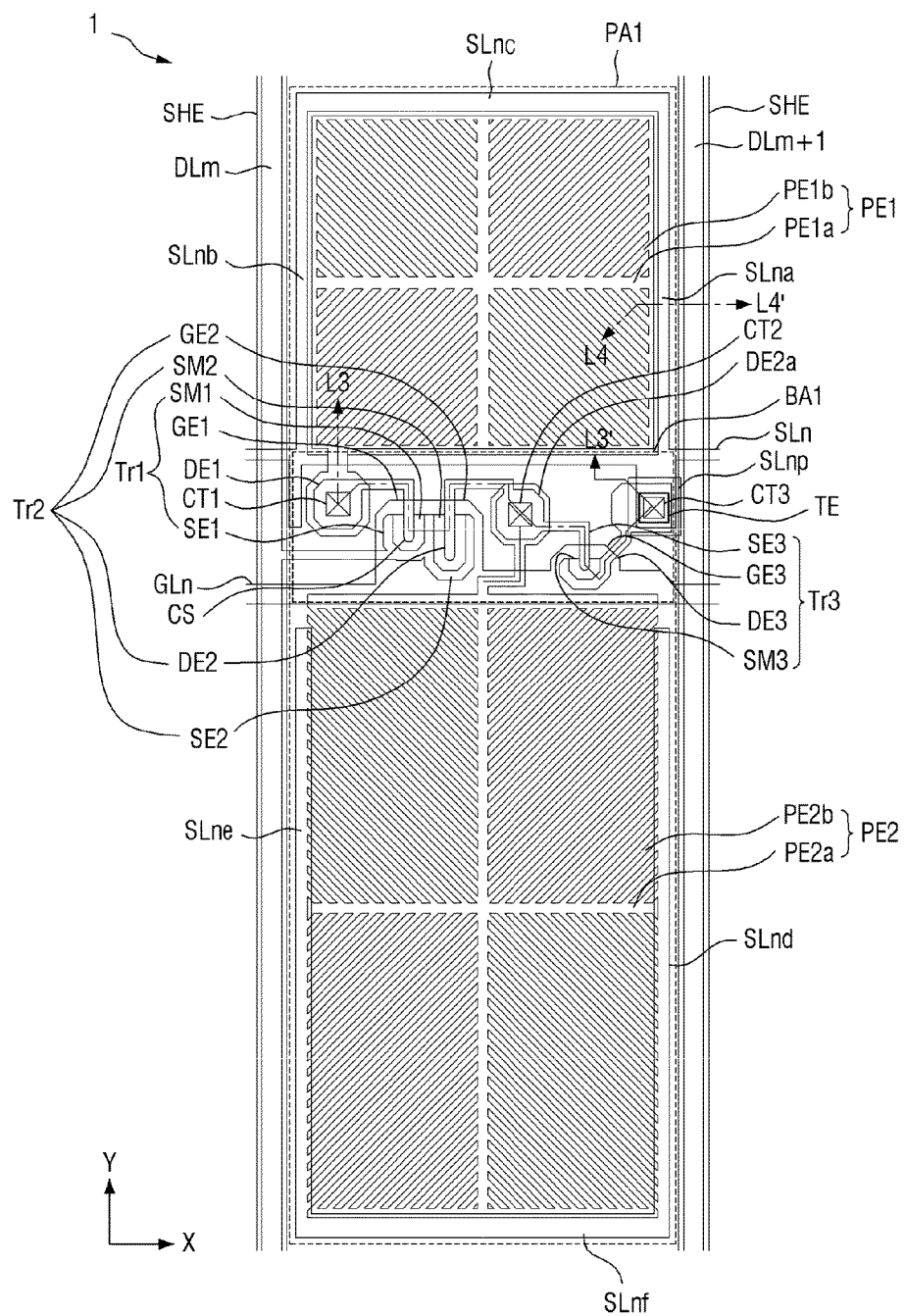
FIG. 2 is a schematic plan view of an array substrate included in the display device according to an embodiment of the present inventive concept, and more specifically, a plan view schematically illustrating a structure of one pixel.
Figure 3:
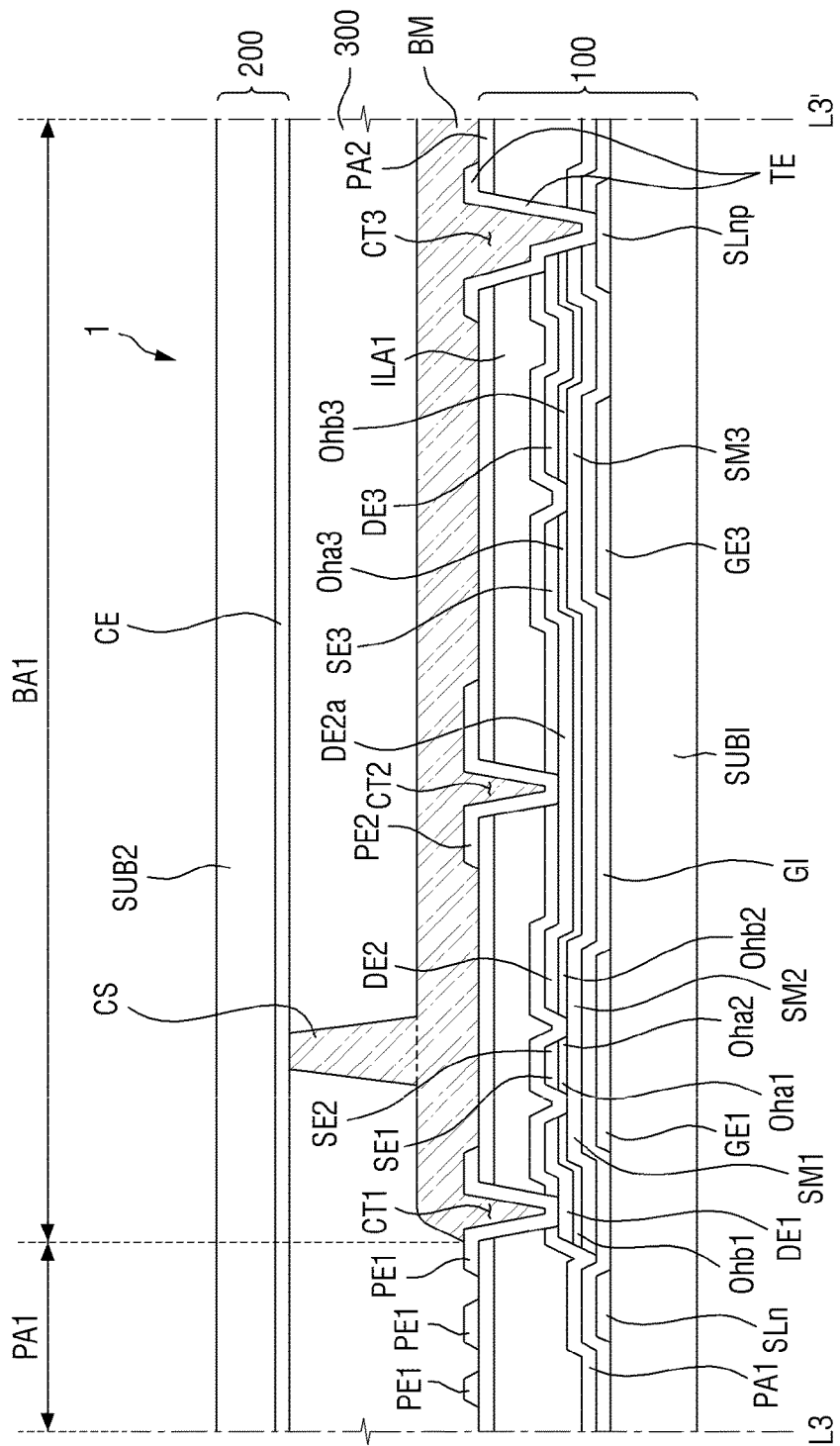
FIG. 3 is a schematic cross sectional view of the display device according to an embodiment of the present inventive concept, taken along line L3-L3' of FIG. 2.
Figure 4:
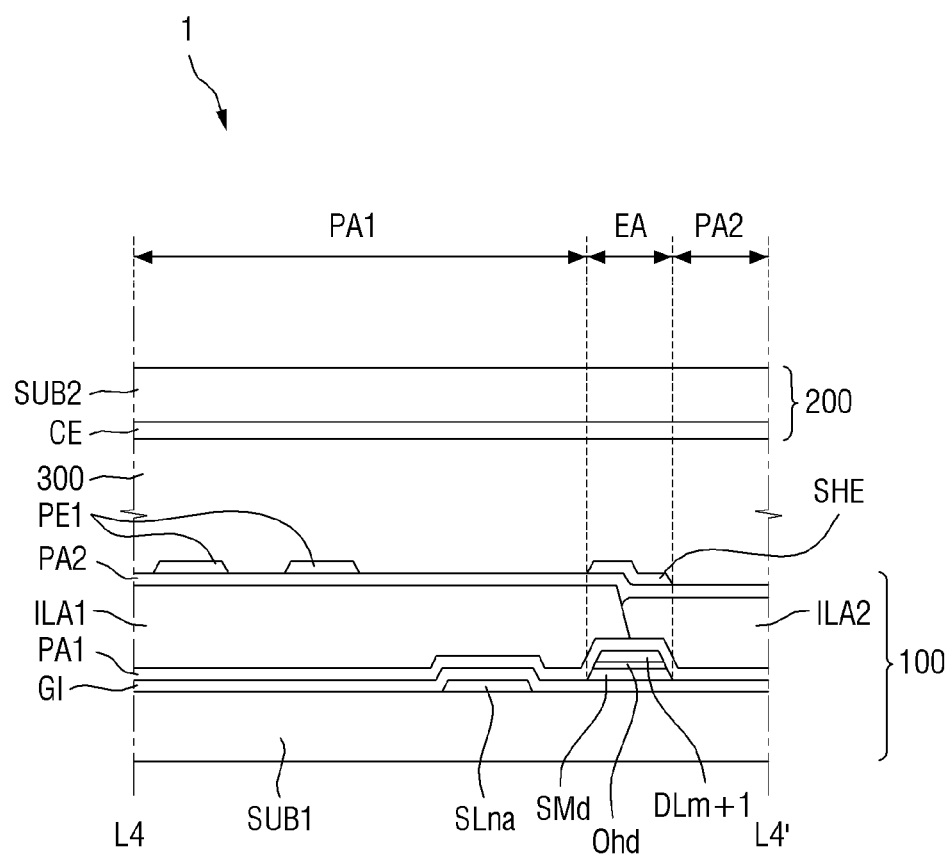
FIG. 4 is a schematic cross sectional view of the display device according to an embodiment of the present inventive concept, taken along line L4-L4' of FIG. 2.

FIG. 2 is a schematic plan view of an array substrate included in the display device according to an embodiment of the present inventive concept, and more specifically, a plan view schematically illustrating a structure of one pixel represented in FIG. 1. FIG. 3 is a schematic cross sectional view of the display device including the array substrate of FIG. 2, taken along line L3-L3' of FIG. 2. FIG. 4 is a schematic cross sectional view of the display device including the array substrate of FIG. 2, taken along line L4-L4' of FIG. 2.

Referring to FIG. 2 to FIG. 4, a display device 1 may include an array substrate 100, a counterpart substrate 200 facing the array substrate 100, and a liquid crystal layer 300 interposed between the array substrate 100 and the counterpart substrate 200, and may further include a pair of polarizers (not shown) attached to outer surfaces of the array substrate 100 and the counterpart substrate 200.

First, the array substrate 100 will be described.

A first insulation substrate SUB1 may be a transparent insulation substrate. For example, the first insulation substrate SUB1 may be formed of a glass substrate, a quartz substrate, a transparent resin substrate and the like. Furthermore, the first insulation substrate SUB1 may include polymers or plastics with high heat resistance. In some embodiments, the first insulation substrate SUB1 may have flexibility. That is, the first insulation substrate SUB1 may be a transformable or flexible substrate which can be rolled, folded or bent.

The first insulation substrate SUB1 may include a pixel region in which one pixel is disposed, and the pixel region may be defined as a region in which a pixel electrode is provided. For example, as shown in FIG. 2, the first insulation substrate SUB1 may include a first pixel region PA1. The first pixel region PA1 may include a first light blocking region BA1.

The gate line GLn may be disposed on the first insulation substrate SUB1. The gate line GLn may mainly extend in a first direction (for example, an X direction) and transmit a gate signal.

A first gate electrode GE1 and a second gate electrode GE2, which extend from the gate line GLn and are connected to each other, may be disposed on the first insulation substrate SUB1. Furthermore, a third gate electrode GE3, which extends from the gate line GLn and is spaced apart from the first gate electrode GE1 and the second gate electrode GE2, may also be disposed on the first insulation substrate SUB1. The first, the second and the third gate electrodes GE1, GE2 and GE3 may be connected to the same gate line GLn, and thus the same gate signal may be applied to the first, the second and the third gate electrodes GE1, GE2 and GE3.

The gate line GLn, the first gate electrode GE1, the second gate electrode GE2 and the third gate electrode GE3 may include aluminum-based metal such as aluminum (Al) or aluminum alloy, silver-based metal such as silver (Ag) or silver alloy, copper-based metal such as copper (Cu) or copper alloy, molybdenum-based metal such as molybdenum (Mo) or molybdenum alloy, chrome (Cr), tantalum (Ta), titanium (Ti) and the like. The gate line GLn, the first gate electrode GE1, the second gate electrode GE2 and the third gate electrode GE3 may have a single layer structure, or a multi-layer structure including at least two conductive layers having different physical properties. One among these multiple conductive layers may be made of low-resistance metal, for example, aluminum-based metal, silver-based metal, copper-based metal and the like, so as to reduce a signal delay or voltage drop. The other conductive layers may be made of different materials, specifically materials having superior contact characteristics with indium tin oxide (ITO) and indium zinc oxide (IZO), for example, molybdenum-based metal, chrome (Cr), titanium (Ti), tantalum (Ta) and the like. An example of such combination may include a lower chrome layer and an upper aluminum layer, or a lower aluminum layer and an upper molybdenum layer. However, the present disclosure is not limited thereto, and the gate line GLn, the first gate electrode GE1, the second gate electrode GE2 and the third gate electrode GE3 may be made of various metals and other conductors.

A gate insulation layer GI may be provided on the gate line GLn and the first, the second and the third gate electrodes GE1, GE2 and GE3. The gate insulation layer GI may be made of an inorganic insulation material, for example, silicon oxide, silicon nitride, silicon oxynitride and the like. The gate insulation layer GI may be formed as a single layer structure, or a multi-layer structure including at least two insulation layers having different physical properties.

A first semiconductor layer SM1, a second semiconductor layer SM2 and a third semiconductor layer SM3 may be formed on the gate insulation layer GI. The first semiconductor layer SM1 may be provided on the first gate electrode GE1, the second semiconductor layer SM2 may be provided on the second gate electrode GE2, and the third semiconductor layer SM3 may be provided on the third gate electrode GE3. In some embodiments, a semiconductor pattern SMd may further be provided beneath data lines DLm and DLm+1. Each of the first second semiconductor layer SM1, the second semiconductor layer SM2, the third semiconductor layer SM3 and the semiconductor pattern SMd may include amorphous silicon, polycrystalline silicon or an oxide semiconductor.

A plurality of ohmic contact members Oha1, Ohb2, Ohb3, Ohb1, Ohb2, Ohb3 and Ohd may be provided on the first semiconductor layer SM1, the second semiconductor layer SM2 and the third semiconductor layer SM3. The plurality of ohmic contact members Oha1, Ohb2, Ohb3, Ohb1, Ohb2, Ohb3 and Ohd may include source ohmic contact members Oha1, Ohb2 and Ohb3 provided beneath the first, the second and the third source electrodes SE1, SE2 and SE3, and drain ohmic contact members Ohb1, Ohb2 and Ohb3 provided beneath the first, the second and the third drain electrodes DE1, DE2 and DE3 to be described later. The data ohmic contact member Ohd may optionally be provided beneath the data lines DLm and DLm+1, and the data ohmic contact member Ohd may be interposed between the data lines DLm and DLm+1 and the semiconductor pattern SMd. In some embodiments, the plurality of ohmic contact members Oha1, Ohb2, Ohb3, Ohb1, Ohb2, Ohb3 and Ohd may be made of n+ hydrated amorphous silicon or the like, which is highly doped with n-type impurities, or silicide. In some embodiments, when the first semiconductor layer SM1, the second semiconductor layer SM2, the third semiconductor layer SM3 and the semiconductor pattern SMd are oxide semiconductors, the ohmic contact members Oha1, Ohb2, Ohb3, Ohb1, Ohb2, Ohb3 and Ohd may be omitted.

The data lines DLm and DLm+1, the first source electrode SE1, the first drain electrode DE1, the second source electrode SE2, the second drain electrode DE2, the third source electrode SE3 and the third drain electrode DE3 may be formed on the ohmic contact members Oha1, Ohb2, Ohb3, Ohb1, Ohb2, Ohb3 and Ohd and the gate insulation layer GI.

The data lines DLm and DLm+1 may transmit data voltages, and mainly extend in a second direction (for example, Y direction) so as to intersect the gate line GLn.

The first source electrode SE1 may be positioned above the first gate electrode GE1 from the first data line DLm. In some embodiments, the first source electrode SE1 may have a C shape above the first gate electrode GE1, but the present disclosure is not limited thereto and any shape is contemplated.

The first drain electrode DE1 may be spaced apart from the first source electrode SE1 above the first gate electrode GE1. A channel may thus be formed in a part of the first semiconductor layer SM1 exposed through the gap between the first source electrode SE1 and the first drain electrode DE1.

The second source electrode SE2 may be positioned above the second gate electrode GE2 from the data line DLm. The second source electrode SE2 may have a C shape above the second gate electrode GE2, but the present disclosure is not limited thereto and any shape is contemplated.

The second drain electrode DE2 may be spaced apart from the second source electrode SE2 above the second gate electrode GE2. A channel may therefore be formed in a part of the second semiconductor layer SM2 exposed through the gap between the second source electrode SE2 and the second drain electrode DE2. The second drain electrode DE2 may have a wide extended part DE2a.

The third source electrode SE3 may be connected to the second drain electrode DE2, and spaced apart from the third drain electrode DE3 above the third gate electrode GE3. A channel may be formed in a part of the third semiconductor layer SM3 exposed through the gap between the third source electrode SE3 and the third drain electrode DE3.

The drain electrode DE3 may be positioned above the third gate electrode GE3. The third drain electrode DE3 may be connected to the sustain electrode line SLn, which will be described later, so as to receive a constant voltage, for example, the sustain voltage Vc.

The data lines DLm and DLm+1, the first source electrode SE1, the first drain electrode DE1, the second source electrode SE2, the second drain electrode DE2, the third source electrode SE3 and the third drain electrode DE3 may be made of one or more conductive materials such as aluminum, copper, silver, molybdenum, chrome, titanium, tantalum or an alloy thereof. Each of these elements may have a multi-layer structure formed of a lower layer (not shown) made of refractory metal and the like and a low-resistance upper layer (not shown) formed on the lower layer, but the present disclosure is not limited thereto.

The first gate electrode GE1, the first semiconductor layer SM1, the first source electrode SE1 and the first drain electrode DE1 described above may together form the first thin film transistor Tr1. Furthermore, the second gate electrode GE2, the second semiconductor layer SM2, the second source electrode SE2 and the second drain electrode DE2 may collectively form the second thin film transistor Tr2, while the third gate electrode GE3, the third semiconductor layer SM3, the third source electrode SE3 and the third drain electrode DE3 may collectively form the third thin film transistor Tr3.

A first passivation layer PA1 may be provided on the data lines DLm and DLm+1, the first, the second and the third source electrodes SE1, SE2 and SE3 and the first, the second and the third drain electrodes DE1, DE2 and DE3. The first passivation layer PA1 may include an organic insulation material or an inorganic insulation material such as silicon oxide, silicon nitride, silicon oxynitride and the like. The first passivation layer PA1 may protect the first, the second and the third thin film transistors Tr1, Tr2 and Tr3, and prevent material of an insulation layer ILA, which will be described later, from being introduced into the first, the second and the third semiconductor layers SM1, SM2 and SM3.

A first insulation layer ILA1 may be provided on the first passivation layer PA1. In some embodiments, the first insulation layer ILA1 may have a function of flattening an upper portion of the first passivation layer PA1. The first insulation layer ILA1 may include a photosensitive material. The photosensitive material may be a photosensitive organic material, for example, a photoresist. In some embodiments, insulation layer ILA1 may include a negative type photoresist in which a part exposed to light is hardened, or a positive type photoresist in which a part not exposed to light is hardened.

The first insulation layer ILA1 may further include a color pigment. For example, the first insulation layer ILA1 may include a color pigment which passes light in a wavelength range corresponding to a specific color. That is, the first insulation layer ILA1 may be a color filter. In an exemplary embodiment, the color filter may present or pass a primary color such as a red color, a green color or a blue color. However, the colors need not be limited to these particular primary colors, and the color filter may instead present any one of cyan, magenta, yellow and white-based colors, or any other color, primary or otherwise, as desired. When the first insulation layer ILA1 includes a color pigment, the first insulation layer ILA1 may at least partially overlap the insulation layer of a neighboring pixel above the data lines DLm and DLm+1. For example, the first insulation layer ILA1 may at least partially overlap a second insulation layer ILA2 in a neighboring pixel region (or a second pixel region PA2) above the second data line DLm+1. However, the present disclosure is not limited thereto, and the first insulation layer ILA1 need not necessarily include a color pigment. In another embodiment, a separate color filter may be provided on the array substrate 100, or a color filter may be provided on the counterpart substrate 200.

The second passivation layer PA2 may be provided on the first insulation layer ILA1. The second passivation layer PA2 may include an inorganic insulation material such as silicon oxide, silicon nitride, silicon oxynitride and the like.

The second passivation layer PA2 may prevent the first insulation layer ILA1 from separating, and inhibit the liquid crystal layer 300 from being contaminated by an organic material such as a solvent introduced from the first insulation layer ILA1. Thus, afterimage defects which may occur during driving of the display device 1 can be further prevented.

A first contact hole CT1 for exposing a part of the first drain electrode DE1 and a second contact hole CT2 for exposing a part of the second drain electrode DE2 may be formed in the first passivation layer PA1, the first insulation layer ILA1 and the second passivation layer PA2.

The pixel electrode PE may be provided on the second passivation layer PA2, and the pixel electrode PE may be provided in the first pixel region PA1 of the first insulation substrate SUB1. That is, the first pixel region PA1 may be defined as a part of the first insulation substrate SUB1 corresponding to the pixel electrode PE. The pixel electrode PE may include a first subpixel electrode PE1 and a second subpixel electrode PE2. When viewed in plan view (i.e. the view of FIG. 2), the first subpixel electrode PE1 and the second subpixel electrode PE2 may be arranged along the second direction (or the Y direction) with the gate line GLn interposed therebetween. That is, in an exemplary embodiment, the first subpixel electrode PE1 may be provided above the gate line GLn, and the second subpixel electrode PE2 may be provided under the first subpixel electrode PE1 and below the gate line GLn. The first light blocking region BA1, which will be described later, may be defined as a region between the first subpixel electrode PE1 and the second subpixel electrode PE2.

The first subpixel electrode PE1 may be connected to the first drain DE1 through the first contact hole CT1, and the second subpixel electrode PE2 may be connected to the second drain DE2 through the second contact hole CT2.

The first subpixel electrode PE1 and the second subpixel electrode PE2 may receive a data voltage respectively from the first drain electrode DE1 and the second drain electrode DE2. In this case, the data voltage applied to the second drain electrode DE2 may be divided through the third source electrode SE3, and the magnitude of the second subpixel voltage applied to the second subpixel electrode PE2 may therefore be smaller than the magnitude of the first subpixel voltage applied to the first subpixel electrode PE1. More precisely, when the data voltages applied to the first subpixel electrode PE1 and the second subpixel electrode PE2 are positive (+), the magnitude of the voltage applied to the second subpixel electrode PE2 is smaller than the magnitude of the voltage applied to the first subpixel electrode PE1. When, on the contrary, the data voltages applied to the first subpixel electrode PE1 and the second subpixel electrode PE2 are negative (−), the magnitude of the first subpixel voltage applied to the first subpixel electrode PE1 may be smaller than the magnitude of the second subpixel voltage applied to the second subpixel electrode PE2.

The first subpixel electrode PE1 may include a first stem PE1a and a plurality of first branches PE1b protruding and extending outward from the first stem PE1a. The first stem PE1a may be shaped in any manner. For example, as shown in FIG. 2, the first stem PE1a may have a cross shape. In this case, the first subpixel may be divided into four domains by the first stem PE1a.

The first branches PE1b may extend in different directions in each domain. The first branches PE1b may extend in parallel with each other in each domain, and may be spaced apart from each other. Adjacent first branches PE1b may be spaced apart on a micrometer spacing basis so as to form a plurality of fine slits.

The subpixel electrode PE1 may be made of a transparent conductive material. For example, the subpixel electrode PE1 may be made of a material such as ITO, IZO, ITZO or AZO.

Liquid crystal molecules of the liquid crystal layer 300 over the first subpixel electrode PE1 may be pretilted in different directions in each domain by the plurality of fine slits. For example, the liquid crystal molecules may be pretilted in four directions headed toward the first stem PE1a. Thus, four domains in which liquid crystal molecules are aligned in different directions may be formed in the liquid crystal layer 300. As described above, varying the pretilt direction of the liquid crystal molecules may enable the display device 1 to have a wide reference view angle.

The second subpixel electrode PE2 may include a second stem PE2a and a plurality of second branches PE2b protruding and extending away from the second stem PE2a. That is, the second subpixel electrode PE2 may have a configuration substantially the same as that of the subpixel electrode PE1. Therefore, detailed description of the configuration of the second subpixel electrode PE2 will be omitted.

The second subpixel electrode PE2 may have an area larger than the area of the first subpixel electrode PE1 when viewed in plan view.

The sustain electrode line SLn may be further provided on the first insulation substrate SUB1. The sustain electrode line SLn may extend in a direction (for example, a horizontal direction) substantially the same as that of the gate line GLn. The sustain electrode line SLn may be formed to enclose at least a part of the pixel electrode PE, which will be described later. For example, the sustain electrode line SLn may further include a first sustain electrode SLna, a second sustain electrode SLnb and a third sustain electrode SLnc enclosing a part of the first subpixel electrode PE1. Furthermore, the sustain electrode line SLn may further include a sustain electrode extension SLnp extending from the first sustain electrode SLna or the second sustain electrode SLnb. A sustain electrode contact hole CT3, which is a third contact hole for exposing a part of the sustain electrode extension SLnp and a part of the third drain electrode DE3, may be formed in the gate insulation layer GI, the first passivation layer PA1, the insulation layer ILA and the second passivation layer PA2, and the sustain electrode contact hole CT3 may be covered by a connection member TE. The connection member TE may electrically interconnect the sustain electrode extension SLnp and the third drain electrode DE3 which are exposed through the sustain electrode contact hole CT3. In some embodiments, the connection member TE may be made of a material that is the same as that of the pixel electrode PE, and the connection member TE and the pixel electrode PE may be provided in the same layer.

The sustain electrode line SLn may further include a fourth sustain electrode SLnd, a fifth sustain electrode SLne and a sixth sustain electrode SLnf enclosing a part of the second subpixel electrode PE2. In some embodiments, the sustain electrode extension SLnp may extend to the space between the pixel electrode PE and the gate line GLn when viewed in plan view. Furthermore, in some embodiments, the first sustain electrode SLna, the second sustain electrode SLnb, the fourth sustain electrode SLnd and the fifth sustain electrode SLne may be interposed between the pixel electrode PE and the data lines DLm and DLm+1 when viewed in plan view.

In an exemplary embodiment, the sustain electrode line SLn, the gate line GLn and the first, the second and third gate electrodes GE1, GE2 and GE3 may be provided in the same layer and be made of the same material. That is, in the exemplary embodiment, the sustain electrode line SLn may be interposed between the first insulation substrate SUB1 and the gate insulation layer GI, and made of a material that is the same as that of the gate line GLn.

A shield electrode SHE may be provided on the second passivation layer PA2. The shield electrode SHE may be physically spaced apart from the first subpixel electrode PE1 and the second subpixel electrode PE2, and the shield electrode SHE, the first subpixel electrode PE1 and the second subpixel electrode PE2 may be provided in the same layer. That is, like the first subpixel electrode PE1 and the second subpixel electrode PE2, the shield electrode SHE may be provided directly on the second passivation layer PA2 so as to directly contact the second passivation layer PA2. The shield electrode SHE may be made of a transparent conductive material, and may also be made of the same material as that of the pixel electrode PE. In some embodiments, the shield electrode SHE, the first subpixel electrode PE1 and the second subpixel electrode PE2 may be formed simultaneously through a photolithography process using a single mask.

The shield electrode SHE may be provided on a part of an upper surface of the second passivation layer PA2 corresponding to the data lines DLm and DLm+1, and may overlap the data lines DLm and DLm+1. In an exemplary embodiment, the shield electrode SHE may be arranged to correspond to a boundary between the pixel regions of the first insulation substrate SUB1. For example, the shield electrode SHE may be provided on a boundary region EA of the first insulation substrate SUB1, which is a boundary between the first pixel region PA1 and its neighboring second pixel region PA2 in the first direction (or X direction). The shield electrode SHE may cover the first data line DLm when viewed in plan view. In some embodiments, a voltage having a level or magnitude the same as that of the common voltage applied to the common electrode CE, which will be described later, may be applied to the shield electrode SHE.

There exists a possibility of misalignment of liquid crystal molecules in a portion between the data lines DLm and DLm+1 and the pixel electrode PE, since a relatively weak electric field may be generated between the pixel electrode PE and the common electrode CE in that portion, which will be described later.

In the display device 1 according to the present embodiment, a voltage having a level the same as that of the voltage applied to the common electrode CE, for example a common voltage, may be applied to the shield electrode SHE. Thus, no electric field may be generated between the common electrode CE and the shield electrode SHE. Accordingly, the possibility of misalignment of liquid crystal molecules provided in the region adjacent to the data lines DLm and DLm+1 may be lowered, thus reducing light leakage. Furthermore, an area of the light blocking member BM, which will be described later and which is formed to prevent light leakage, may further be reduced or the light blocking member BM may be omitted. Thus, an aperture ratio of the display device 1 may further be increased.

Furthermore, an electric field generated between the data lines DLm and DLm+1 and the pixel electrode PE may be weakened by the shield electrode SHE, thus providing an advantage of inhibiting crosstalk defects.

The light blocking member BM may be provided on a part of the first subpixel electrode PE1, a part of the second subpixel electrode PE2, a part of the second passivation layer PA2 and a part of the shield electrode SHE. The light blocking member BM may be provided on the first light blocking region BA1 of the first pixel region PA1 of the first insulation substrate SUB1. In some embodiments, the light blocking member BM may directly contact a part of the first subpixel electrode PE1, a part of the second subpixel electrode PE2, a part of the second passivation layer PA2 and a part of the shield electrode SHE. The light blocking member BM may at least partially overlap the gate line GLn and the first, the second and the third thin film transistors Tr1, Tr2 and Tr3. Furthermore, at least a part of the light blocking member BM may fill the first contact hole CT1, the second contact hole CT2 and the sustain electrode contact hole CT3. The light blocking member BM may include a light blocking pigment, for example black carbon, and a photosensitive organic material.

In the display device 1 according to the present embodiment, the light blocking member BM may be provided on the array substrate 100 together with (i.e. over) the first, the second and the third thin film transistors Tr1, Tr2 and Tr3. Thus, light leakage caused by a misalignment between any of these elements, or a decrease in an aperture ratio, may be prevented while improving transmittance.

A spacer member CS may be provided on the light blocking member BM, and may directly contact the light blocking member BM. The spacer member CS may directly contact the counterpart substrate 200, so as to maintain a gap between the array substrate 100 and the counterpart substrate 200. In some embodiments, the spacer member CS may include a light blocking pigment, and may be made of the same material as that of the light blocking member BM. In some embodiments, the spacer member CS may be formed integrally with the light blocking member BM, and the spacer member CS and the light blocking member BM may be formed simultaneously through a single photolithography process using a slit mask, a halftone mask or the like.

In some embodiments, the spacer member CS may be arranged to overlap a thin film transistor. In an exemplary embodiment, the spacer member CS may be positioned so as to overlap at least one of the first thin film transistor Tr1, the second thin film transistor Tr2 and the third thin film transistor Tr3. Although the spacer member CS is depicted as overlapping the first thin film transistor Tr1 in the drawings, this is merely an example. As the spacer member CS may be arranged to overlap a thin film transistor, the size of the light blocking member BM is reduced as compared to conventional configurations in which this is not the case, thus improving the aperture ratio of the display device 1.

The counterpart substrate 200 will now be described.

The counterpart substrate 200 may include a second insulation substrate SUB2 and the common electrode CE.

The second insulation substrate SUB2 may be a transparent insulation substrate like the first insulation substrate SUB1. Furthermore, the second insulation substrate SUB2 may include polymers or plastics with high heat resistance. In some embodiments, the second insulation substrate SUB2 may have flexibility.

The common electrode CE may be provided on one surface of the second insulation substrate SUB2 that is directed toward, or facing, the first insulation substrate SUB1. The common electrode CE may be made of a transparent conductive material such as ITO and IZO. In some embodiments, the common electrode CE may be formed over substantially the entire surface of the second insulation substrate SUB2. The common electrode CE may receive common voltage Vcom applied thereto so as to generate an electric field together with the pixel electrode PE.

The liquid crystal layer 300 will be described hereinafter.

The liquid crystal layer 300 may include a plurality of liquid crystal molecules having dielectric anisotropy. The liquid crystal molecules may be vertically aligned liquid crystal molecules interposed between the array substrate 100 and the counterpart substrate 200, and aligned vertically with respect to the two substrates 100 and 200. When an electric field is applied between the array substrate 100 and the counterpart substrate 200, the liquid crystal molecules may rotate in a specific direction between the array substrate 100 and the counterpart substrate 200 so as to either pass or block light. The term "rotate" as used herein may not only mean that the liquid crystal molecules actually rotate, but may also mean that the alignment of the liquid crystal molecules changes by the electric field in any manner. In some embodiments, the liquid crystal layer 300 may include a reactive mesogen which undergoes polymerization reaction by light such as ultraviolet rays, or may include a pre-tilt providing polymer produced by a polymerization reaction of a reactive mesogen. The pre-tilt providing polymer may provide pre-tilt to the liquid crystal molecules even in the state where no electric field is generated between the array substrate 100 and the counterpart substrate 200.

Figure 5:
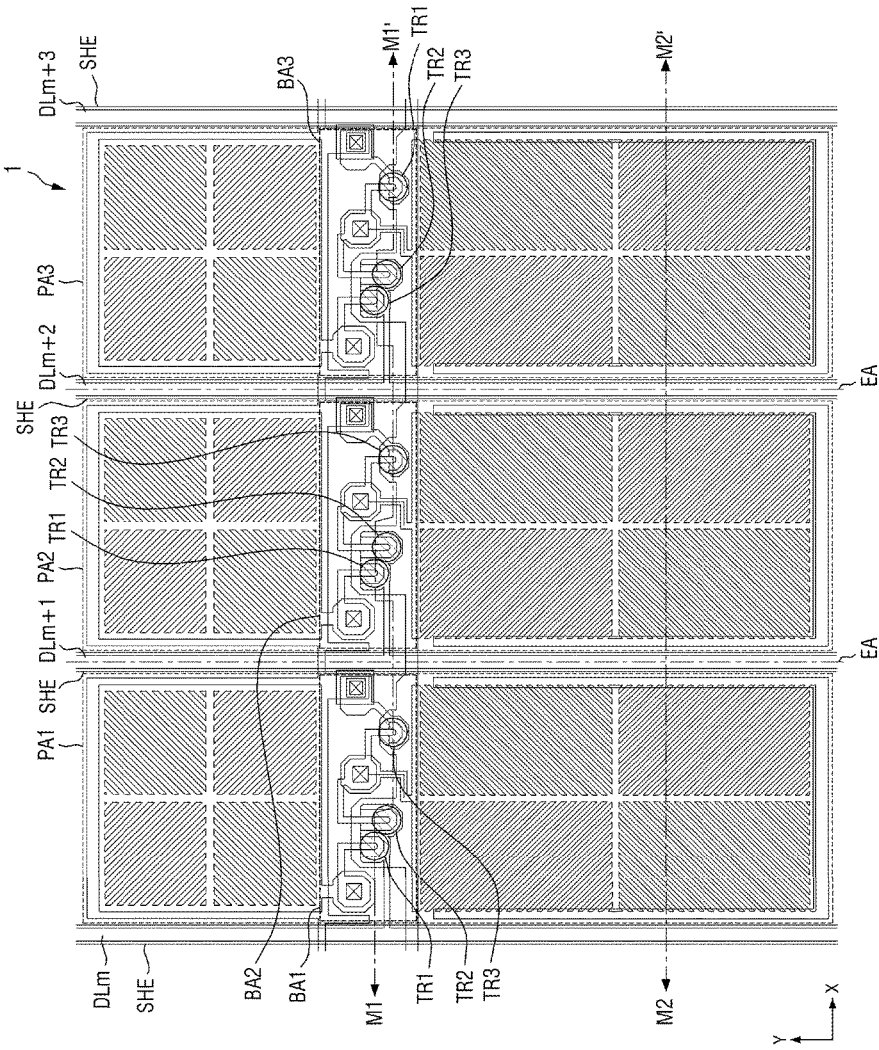
FIG. 5 is a plan view schematically illustrating three pixels of the display device according to an exemplary embodiment of the present inventive concept.
Figure 6:
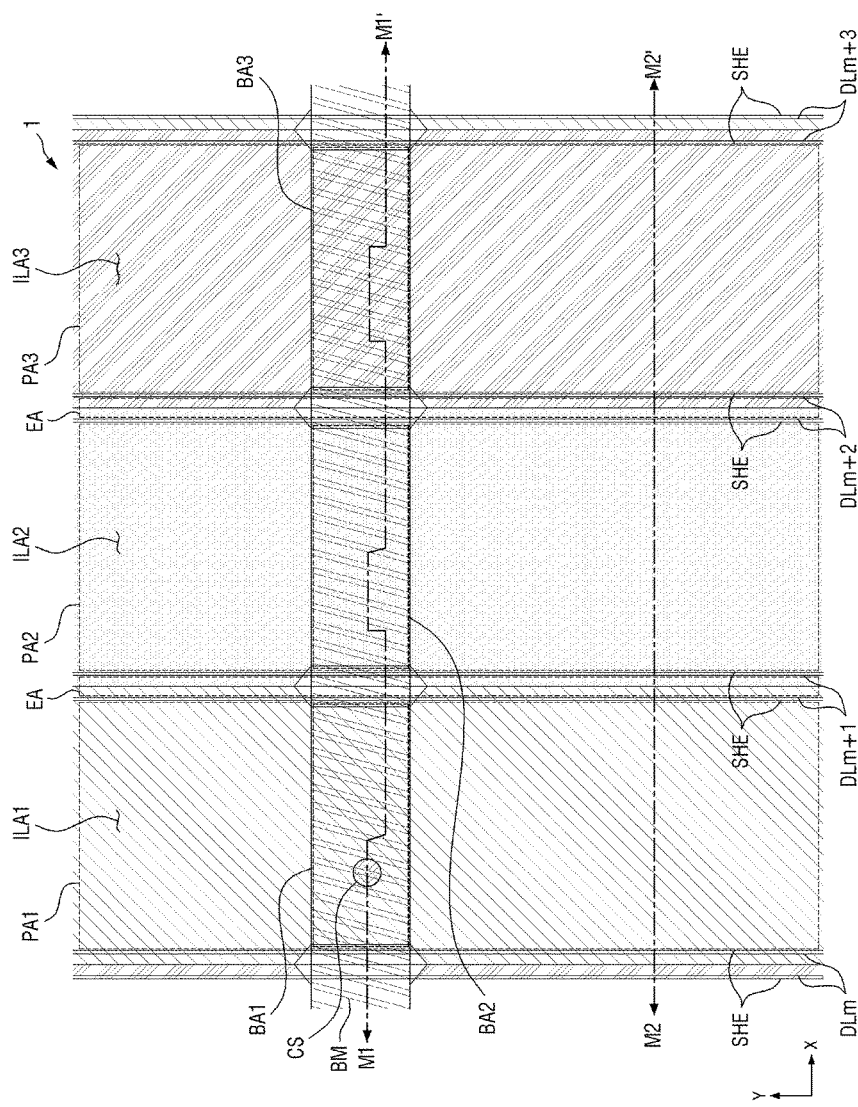
FIG. 6 is a plan view schematically illustrating an exemplary arrangement of insulation layers, a light blocking member, data lines and shield electrodes in the display device shown in FIG. 5.
Figure 7:
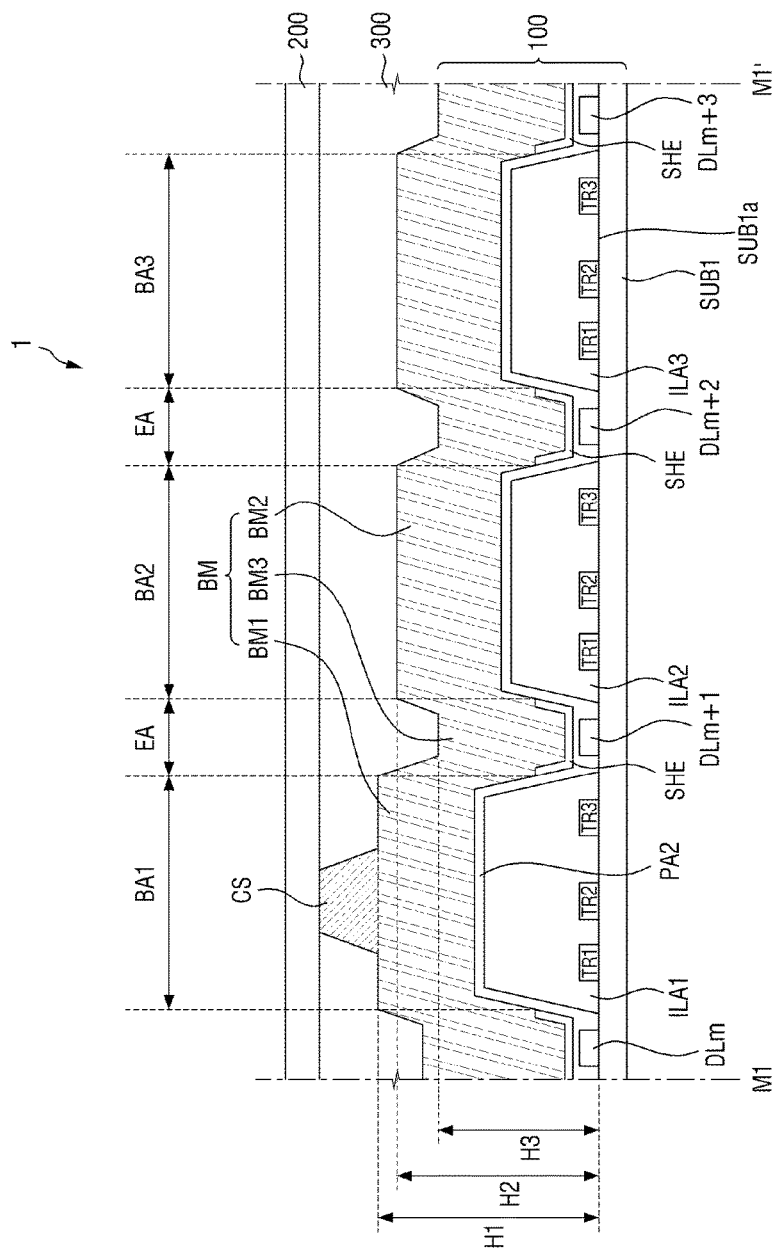
FIG. 7 is a schematic cross sectional view taken along line M1-M1' of FIG. 5 and FIG. 6.
Figure 8:
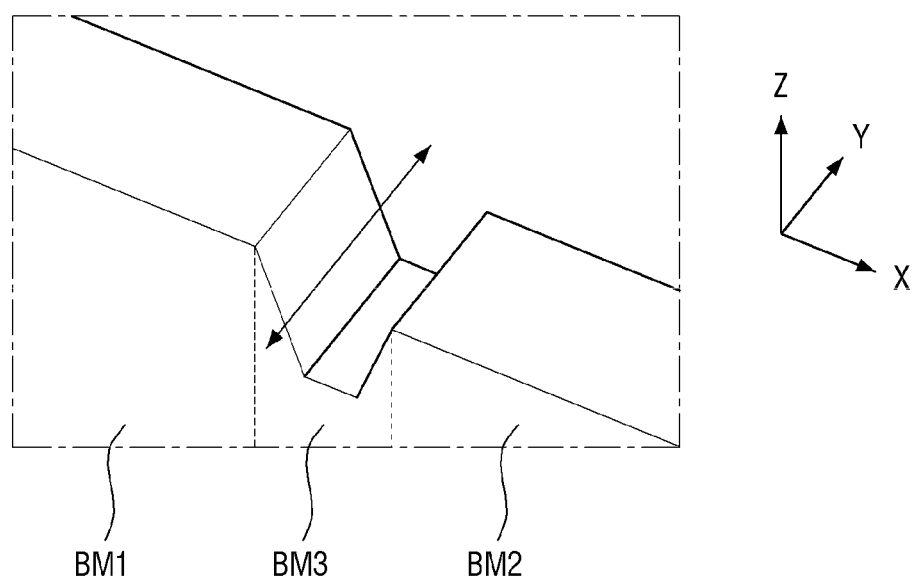
FIG. 8 is an enlarged perspective view illustrating a part of the light blocking member shown in FIG. 7.
Figure 9:
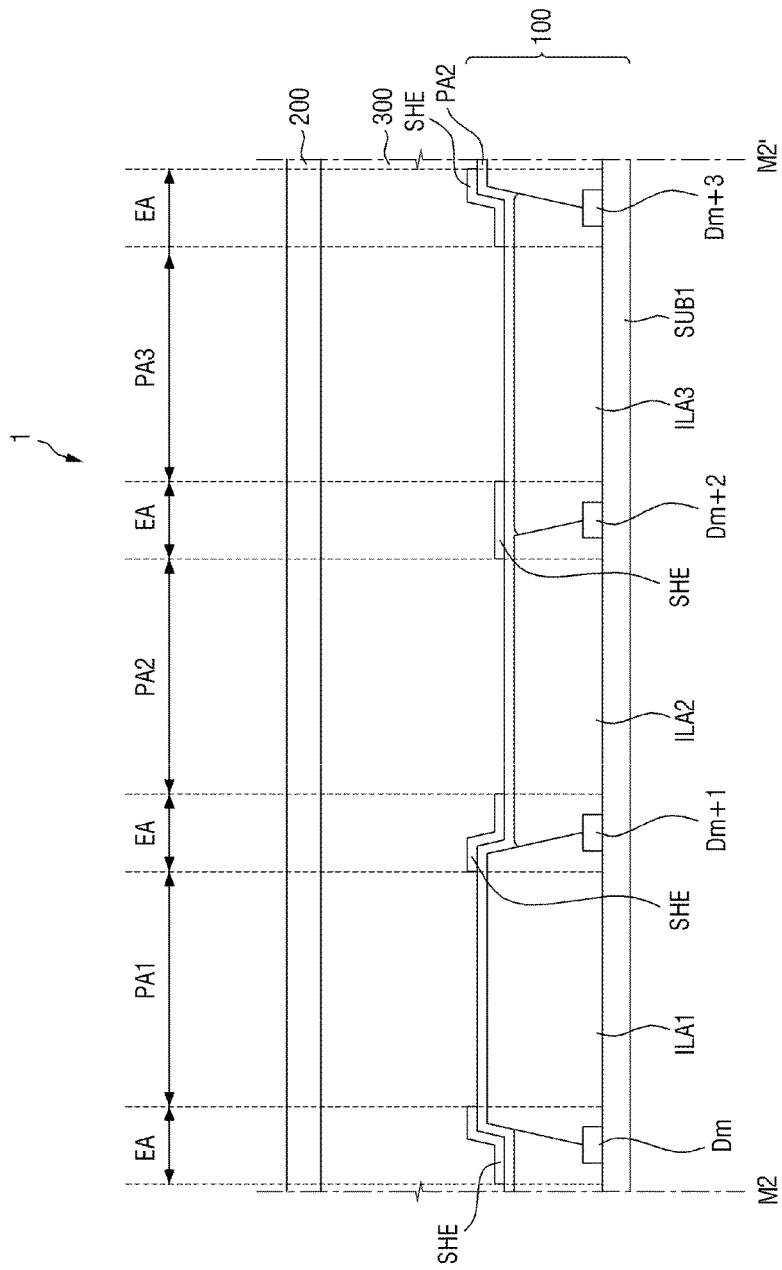
FIG. 9 is a schematic cross sectional view taken along line M2-M2' of FIG. 5 and FIG. 6.

FIG. 5 is a plan view schematically illustrating three pixels of the display device according to an exemplary embodiment of the present inventive concept. FIG. 6 is a plan view schematically illustrating an exemplary arrangement of insulation layers, a light blocking member, data lines and shield electrodes in the display device shown in FIG. 5. FIG. 7 is a schematic cross sectional view taken along line M1-M1' of FIG. 5 and FIG. 6. FIG. 8 is an enlarged perspective view illustrating a part of the light blocking member shown in FIG. 7. FIG. 9 is a schematic cross sectional view taken along line M2-M2' of FIG. 5 and FIG. 6.

FIG. 5 to FIG. 9 illustrate pixels provided in the first pixel region PA1, the second pixel region PA2 neighboring the first pixel region PA1 in the first direction (or X direction), and a third pixel region PA3 neighboring the second pixel region PA2 in the first direction (or X direction), that is, a 1×3 array of pixels. Furthermore, FIG. 5 to FIG. 9 illustrate mainly the first light blocking region BA1 provided in the first pixel region PA1, a second light blocking region BA2 provided in the second pixel region PA2, a third light blocking region BA3 provided in the third pixel region PA3, and the first, the second and the third thin film transistors Tr1, Tr2 and Tr3 provided in each of the respective light blocking regions BA1, BA2 and BA3. FIG. 5 and FIG. 6 illustrate the first, the second and the third light blocking regions BA1, BA2 and BA3 corresponding to the respective 1×3 array of pixels.

For the sake of convenience in description, FIG. 7 and FIG. 9 omit some of the components provided between the first insulation substrate SUB1 and insulation layers of the array substrate 100, and also omit a detailed configuration of the counterpart substrate 200.

Referring to FIG. 5 to FIG. 9, the first pixel region PA1, the second pixel region PA2 and the third pixel region PA3 may be arranged in parallel along the first direction (X direction). The boundary region EA may be provided between the first pixel region PA1 and the second pixel region PA2, and between the second pixel region PA2 and the third pixel region PA3. The first data line DLm and the second data line DLm+1 may be provided at both longitudinal sides of the first pixel region PA1, the second data line DLm+1 and a third data line DLm+2 may be provided at both longitudinal sides of the second pixel region PA2, and the third data line DLm+2 and a fourth data line DLm+3 may be provided at both longitudinal sides of the third pixel region PA3. In this case, the first data line DLm, the second data line DLm+1, the third data line DLm+2 and the fourth data line DLm+3 may be provided in the respective boundary regions EAs. The shield electrode SHE may be provided above each of the data lines DLm, DLm+1, DLm+2 and DLm+3 with the second passivation layer PA2 interposed therebetween.

As described above, the pixel regions PA1, PA2 and PA3 may include respective light blocking regions BA1, BA2 and BA3. Specifically, the first pixel region PA1 may include the first light blocking region BA1, the second pixel region PA2 may include the second light blocking region BA2, and the third pixel region PA3 may include the third light blocking region BA3.

The first insulation layer ILA1 described above with reference to FIG. 2 to FIG. 4 may be disposed in the first pixel region PA1, the second insulation layer ILA2 may be disposed in the second pixel region PA2, and a third insulation layer ILA3 may be disposed in the third pixel region PA3. In an exemplary embodiment, the first insulation layer ILA1 may be a first color filter including a first color pigment, the second insulation layer ILA2 may be a second color filter including a second color pigment different from the first color pigment, and the third insulation layer ILA3 may be a third color filter including a third color pigment different from both the first color pigment and the second color pigment. In some embodiments, the first insulation layer ILA1 may be a blue color filter, the second insulation layer ILA2 may be either a green color filter or a red color filter, and the third insulation layer ILA3 may be the other of the green color filter and the red color filter. In this case, as shown in FIG. 6 and FIG. 8, the first insulation layer ILA1 may have a thickness greater than the thickness of the second insulation layer ILA2 and the thickness of the third insulation layer ILA3.

The insulation layers ILA1, ILA2, ILA3 neighboring each other may be spaced apart from each other in a portion of the boundary region provided between the light blocking regions. Alternatively, the insulation layers ILA1, ILA2, ILA3 may partially overlap each other in a portion of the boundary region provided between the pixel regions and outside the light blocking regions.

For example, as shown in FIG. 6 and FIG. 7, the first insulation layer ILA1 and the second insulation layer ILA2 may be spaced apart from each other in the boundary region EA between the first light blocking region BA1 and the second light blocking region BA2. Similarly, the second insulation layer ILA2 and the third insulation layer ILA3 may be spaced apart from each other in the boundary region EA between the second light blocking region BA2 and the third light blocking region BA3. Alternatively, the first insulation layer ILA1 and the second insulation layer ILA2 may overlap each other in the boundary region EA between the first pixel region PA1 and the second pixel region PA2 and outside the light blocking regions BA1 and BA2. Similarly, the second insulation layer ILA2 and the third insulation layer ILA3 may overlap each other in the boundary region EA between the second pixel region PA2 and the third pixel region PA3 and outside the light blocking regions BA2 and BA3.

The light blocking member BM may overlap or form the first light blocking region BA1, the second light blocking region BA2 and the third light blocking region BA3, and may extend in the first direction (or X direction). In other words, a part of the light blocking member BM overlapping or forming the first light blocking region BA1, a part of the light blocking member BM overlapping or forming the second light blocking region BA2, and a part of the light blocking member BM overlapping or forming the third light blocking region BA3 may be connected with each other.

As shown in FIG. 6, the light blocking member BM may be disposed on a part of the first insulation layer ILA1 to form the first light blocking region BA1, a part of the second insulation layer ILA2 to form the second light blocking region BA2, and a part of the third insulation layer ILA3 to form the third light blocking region BA3. Furthermore, as shown in FIG. 7, the light blocking member BM may fill the space between the first insulation layer ILA1 and the second insulation layer ILA2 and the space between the second insulation layer ILA2 and the third insulation layer ILA3. Hereinafter, for the sake of convenience in explanation, the part of the light blocking member BM forming the first light blocking region BA1 will be defined as a first part BM1, the part of the light blocking member BM forming the second light blocking region BA2 will be defined as a second part BM2, and a part of the light blocking member BM forming the boundary region EA between the first light blocking region BA1 and the second light blocking region BA2 of the first insulation substrate SUB1 will be defined as a third part BM3. In some embodiments, the first part BM1 may be disposed on the first insulation layer ILA1, the second part BM2 may be disposed on the second insulation layer ILA2, and the third part BM3 may be disposed in the space between the first insulation layer ILA1 and the second insulation layer ILA2. The first part BM1 may be disposed at one side of the third part BM3 and the second part BM2 may be disposed at the other side of the third part BM3 in the first direction (or X direction).

The third part BM3 may have both sides open. More specifically, as shown in FIG. 8, both sides of the third part BM3 may open in the second direction (or Y direction), so that third part BM3 creates an open channel allowing fluid flow along the direction of the arrows as shown.

When the minimum height from one surface SUB1a of the first insulation substrate SUB1 to an upper surface of the first part BM1 is referred to as a first height H1, the minimum height from one surface SUB1a of the first insulation substrate SUB1 to an upper surface of the second part BM2 is referred to as a second height H2, and the minimum height from one surface SUB1a of the first insulation substrate SUB1 to an upper surface of the third part BM3 is referred to as a third height H3, the third height H3 may be lower than each of the first height H1 and the second height H2. No separate insulation layer may be provided in the boundary region EA between the first insulation layer ILA1 and the second insulation layer ILA2. The light blocking member BM may have natural stepped portions. Therefore, the third height H3 may be lower than each of the first height H1 and the second height H2, so that a channel or depression is formed between first part BM1 and second part BM2.

In some embodiments, when the first insulation layer ILA1 is a blue color filter, the second insulation layer ILA2 is either a green color filter or a red color filer, and the third insulation layer ILA3 is the other of the green color filter and the red color filer, the first insulation layer ILA1 may be thicker than the second insulation layer ILA2 and the third insulation layer ILA3. In this case, the first height H1 may be higher than the second height H2. That is, a difference between the first height H1 and the second height H2 may be caused by a thickness difference between the first insulation layer ILA1 and the second insulation layer ILA2.

The spacer member CS may be provided on the light blocking member BM. In some embodiments, when the thickness of the first insulation layer ILA1 is thicker than the thickness of the second insulation layer ILA2 and the thickness of the third insulation layer ILA3, the spacer member CS may be disposed to overlap the first insulation layer ILA1. That is, the spacer member CS may be disposed on the first part BM1, and in this case, the second part BM2 may act as an auxiliary spacer member. Furthermore, the spacer member CS may be disposed on the first insulation layer ILA1, which is relatively thick, thereby reducing the thickness of the spacer member CS itself. The degree of compression of the spacer member CS may be in proportion to the thickness of the spacer member CS itself. Thus, when the spacer member CS is disposed on the first insulation layer ILA1 which is relatively thick, the thickness of the spacer member CS itself may be reduced, thereby relatively reducing a deformation of the spacer member CS when a force is applied from an external source.

Disposing the spacer member CS on the first part BM1 may thus provide the advantage of reducing a height difference between the spacer member CS and an auxiliary spacer member, for example, the second part BM2, by using a thickness difference between the first insulation layer ILA1 and the second insulation layer ILA2.

The spacer member CS may include a light blocking pigment, and may be made of the same material as that of the light blocking member BM. Furthermore, in some embodiments, the spacer member CS may be formed integrally with the light blocking member BM. In this case, the spacer member CS and the light blocking member BM may be formed through a photolithography process using a single mask.

For example, when the light blocking member BM is made of a negative type photosensitive material, the light blocking member BM and the spacer member CS may be formed simultaneously using a halftone mask including a light transmitting pattern, a light blocking pattern and a semitransmitting pattern. In this case, the light transmitting pattern may correspond to the spacer member CS, the light blocking pattern may correspond to the regions outside the light blocking regions BA1, BA2 and BA3, and the semitransmitting pattern may correspond to the light blocking regions BA1, BA2 and BA3 excluding the spacer member CS. In this case, the height difference between the third part BM3 and the first part BM1, and the height difference between the third part BM3 and the second part BM2, may be caused by the space between the first insulation layer ILA1 and the second insulation layer ILA2.

Alternatively, in another exemplary embodiment, when the light blocking member BM is made of a negative type photosensitive material, the light blocking member BM and the spacer member CS may be formed simultaneously using a halftone mask including a light transmitting pattern, a light blocking pattern, a first semitransmitting pattern and a second semitransmitting pattern of which transmittance is lower than that of the first semitransmitting pattern. In this case, the light transmitting pattern may correspond to the spacer member CS, and the light blocking pattern may correspond to the region outside the light blocking regions BA1, BA2 and BA3. In addition, the first semitransmitting pattern and the second semitransmitting pattern may correspond to the light blocking regions BA1, BA2 and BA3. Specifically, the second semitransmitting pattern may correspond to the boundary regions EAs between the light blocking regions BA1, BA2 and BA3, and the first semitransmitting pattern may correspond to the portions of the light blocking regions BA1, BA2 and BA3 besides those corresponding to the second semitransmitting pattern. In this case, the height difference between the third part BM3 and the first part BM1, and the height difference between the third part BM3 and the second part BM2, may be caused partly by the space between the first insulation layer ILA1 and the second insulation layer ILA2, and partly by a transmittance difference between the first semitransmitting pattern and the second semitransmitting pattern. That is, the third part BM3 may be hardened by the quantity of light which is relatively smaller than that of the first part BM1 and the second part BM2, thus partly causing the height difference between the third part BM3 and the first part BM1 and the height difference between the third part BM3 and the second part BM2.

When a force is applied from an external source to the display device 1, the spacer member CS interposed between the array substrate 100 and the counterpart substrate 200 may absorb a part of the external force, so as to be compressed. In this case, a gap between the array substrate 100 and the counterpart substrate 200 may be maintained at a predetermined level by the first part BM1 and the second part BM2, thereby securing a space for enabling the liquid crystal layer 300 to be fully spread.

Meanwhile, when a larger force is applied from an external source to the display device 1, the spacer member CS may be completely compressed, and the counterpart substrate 200 may directly contact the first part BM1 and/or the second part BM2. In addition, the first part BM1 and/or the second part BM2 may be partially compressed. In this case, the depression formed by the third part BM3 may allow liquid crystal layer 300 to more freely flow away from the compressed area. Furthermore, both sides of the third part BM3 in the second direction (or Y direction) may be open, thereby securing a path for flow of the liquid crystal layer 300 in the second direction (or Y direction). Thus, degradation of display quality which may be caused when the liquid crystal layer 300 is not fully spread may be prevented. Thus, a display device 1 with improved reliability according to the present inventive concept may be provided.

Figure 10:
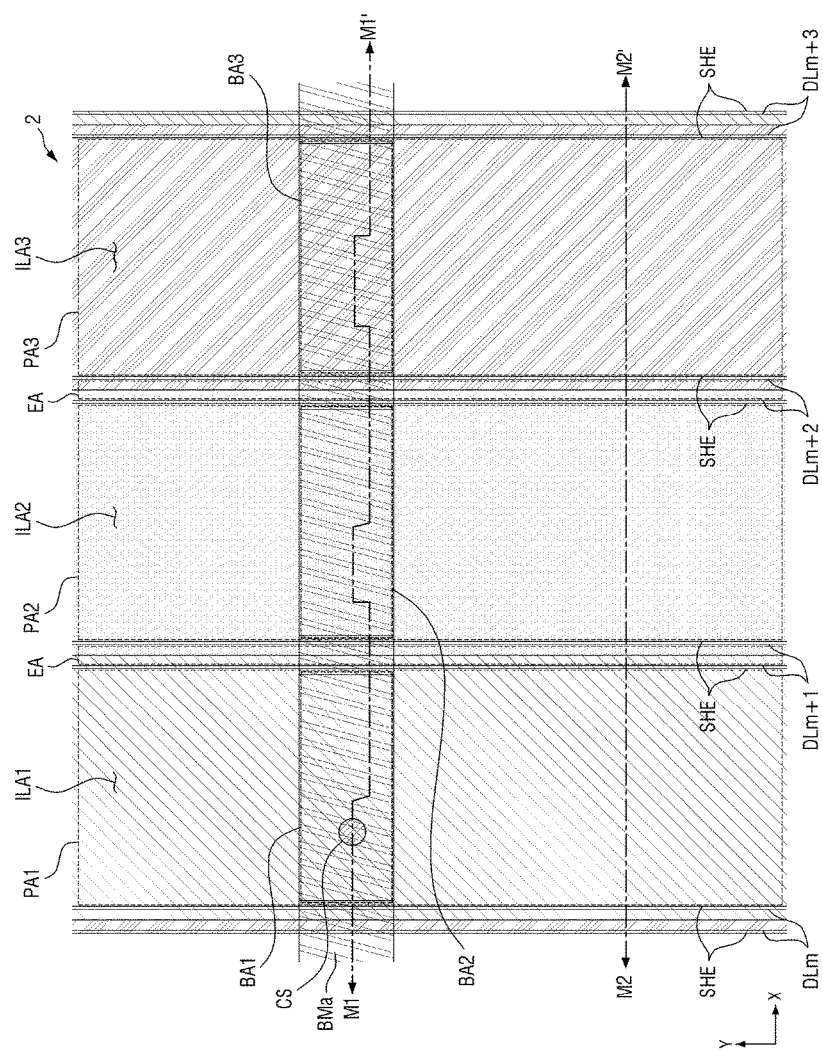
FIG. 10 is a plan view of a modified embodiment of the display device shown in FIG. 5, schematically illustrating another exemplary arrangement of insulation layers, a light blocking member, data lines and shield electrodes in the display device.
Figure 11:
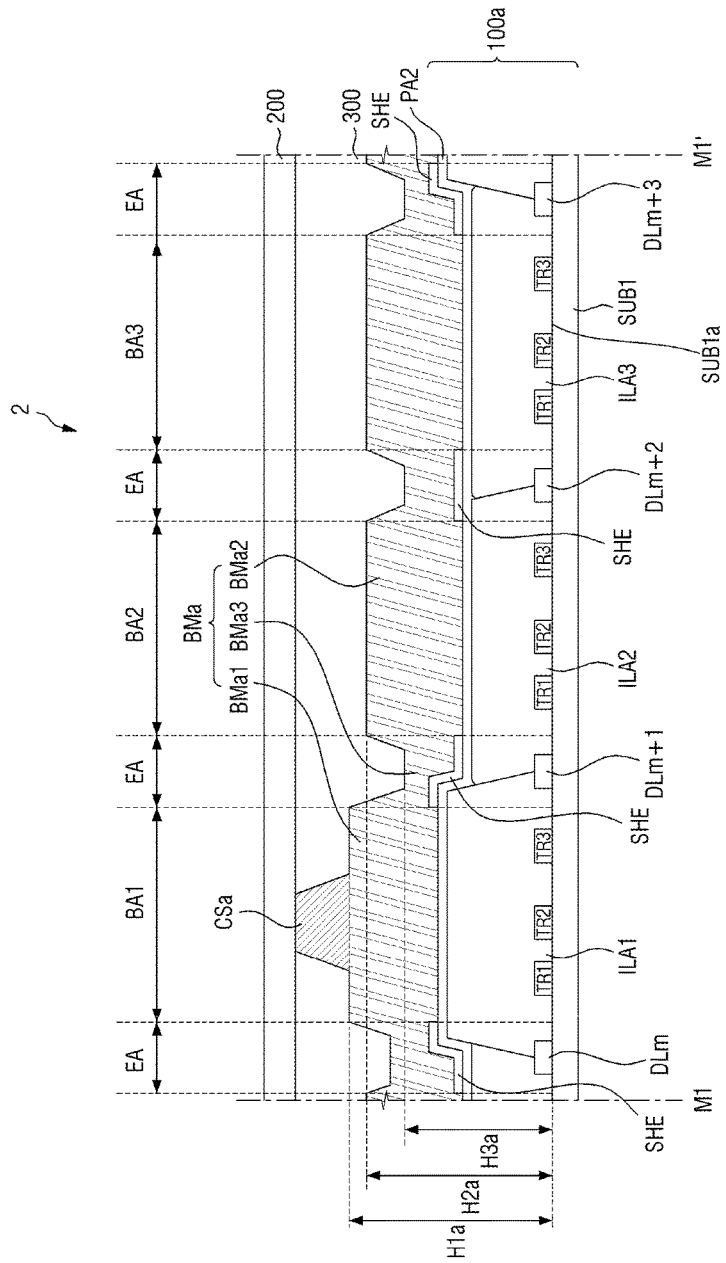
FIG. 11 is a schematic cross sectional view taken along line M1-M1' of FIG. 5 and FIG. 10.
Figure 12:
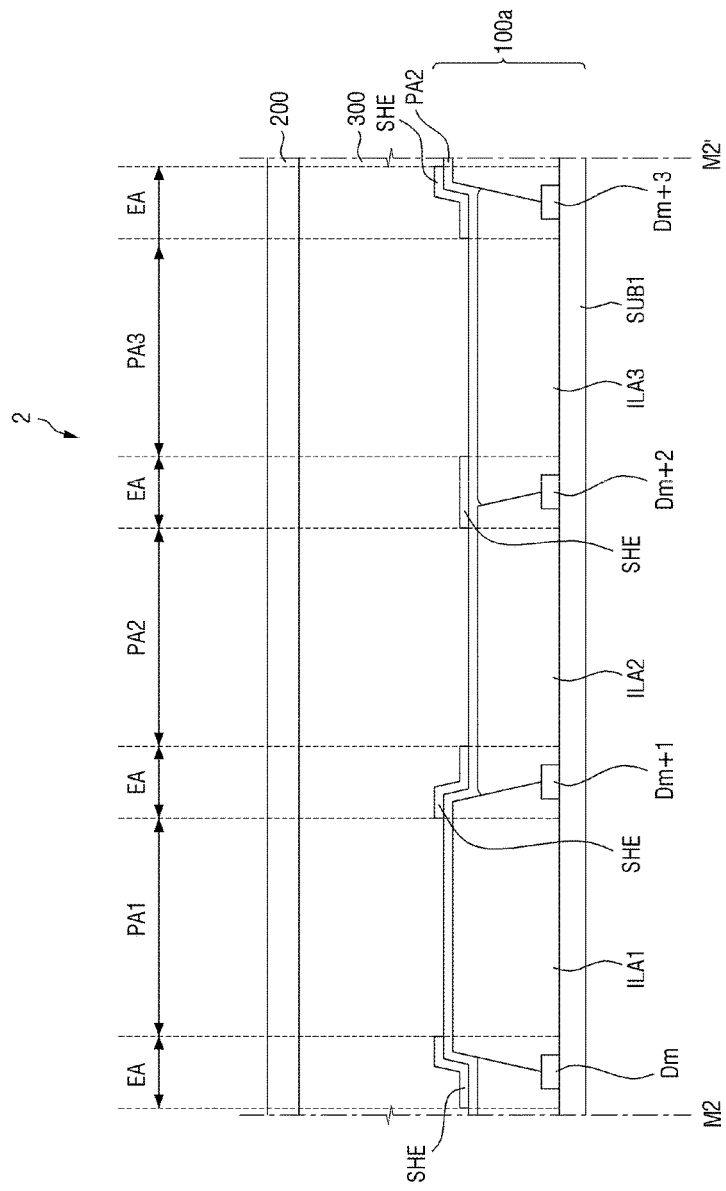
FIG. 12 is a schematic cross sectional view taken along line M2-M2' of FIG. 5 and FIG. 10.

FIG. 10 is a plan view of a modified embodiment of the display device shown in FIG. 5, schematically illustrating another exemplary arrangement of insulation layers, a light blocking member, data lines and shield electrodes in the display device. FIG. 11 is a schematic cross sectional view taken along line M1-M1' of FIG. 5 and FIG. 10. FIG. 12 is a schematic cross sectional view taken along line M2-M2' of FIG. 5 and FIG. 10.

In a display device 2 according to the present embodiment, an array substrate 100a may have a structure partially different from the structure of the array substrate 100 described above with reference to FIG. 5 to FIG. 9. Specifically, the array substrate 100a may be different from the array substrate 100 described above with reference to FIG. 5 to FIG. 9, in that the former includes insulation layers overlapping each other in the boundary regions EAs. However, other components are substantially the same or similar.

Therefore, redundant explanation will be omitted and description will focus primarily on the differences between the embodiments.

Referring to FIG. 10 to FIG. 12, the first insulation layer ILA1 and the second insulation layer ILA2 may partially overlap each other in the boundary region EA between the first light blocking region BA1 and the second light blocking region BA2, as illustrated in FIG. 10 and FIG. 11. Similarly, the second insulation layer ILA2 and the third insulation layer ILA3 may partially overlap in the boundary region EA between the second light blocking region BA2 and the third light blocking region BA3. Furthermore, as shown in FIG. 12, the first insulation layer ILA1 and the second insulation layer ILA2 may partially overlap in the boundary region EA between the first pixel region PA1 and the second pixel region PA2, and outside the light blocking regions BA1 and BA2. Similarly, the second insulation layer ILA2 and the third insulation layer ILA3 may partially overlap in the boundary region EA between the second pixel region PA2 and the third pixel region PA3 and outside the light blocking regions BA2 and BA3.

As shown in FIG. 10 and FIG. 11, the light blocking member BMa may be provided on a part of the first insulation layer ILA1 to form the first light blocking region BA1, a part of the second insulation layer ILA2 to form the second light blocking region BA2, and a part of the third insulation layer ILA3 to form the third light blocking region BA3. Furthermore, the light blocking member BM may be provided on the overlap between the first insulation layer ILA1 and the second insulation layer ILA2, and on the overlap between the second insulation layer ILA2 and the third insulation layer ILA3. Hereinafter, for the sake of convenience in description, the part of the light blocking member BMa overlapping or forming the first light blocking region BA1 will be defined as a first part BMa1, the part of the light blocking member BMa overlapping or forming the second light blocking region BA2 will be defined as a second part BMa2, and a part of the light blocking member BMa overlapping the boundary region EA between the first light blocking region BA1 and the second light blocking region BA2 will be defined as a third part BMa3. In some embodiments, the first part BMa1 may be disposed on the first insulation layer ILA1, the second part BMa2 may be disposed on the second insulation layer ILA2, and the third part BMa3 may be disposed on the overlap between the first insulation layer ILA1 and the second insulation layer ILA2.

The third part BMa3 may have both sides open in the second direction (or Y direction), like the third part BM3 described above with reference to FIG. 8.

When the minimum height from one surface SUB1a of the first insulation substrate SUB1 to an upper surface of the first part BMa1 is referred to as a first height H1a, the minimum height from one surface SUB1a of the first insulation substrate SUB1 to an upper surface of the second part BMa2 is referred to as a second height H2a, and the minimum height from one surface SUB1a of the first insulation substrate SUB1 to an upper surface of the third part BMa3 is referred to as a third height H3a, the third height H3a may be lower than each of the first height H1a and the second height H2a. That is, a stepped portion may exist between the first part BMa1 and the third part BMa3, and likewise a stepped portion may exist between the second part BMa2 and the third part BMa3, so that a channel or depression is formed between first part BMa1 and second part BMa2.

A spacer member CSa may be provided on the light blocking member BMa. In some embodiments, when the first insulation layer ILA1 is formed to have a thickness greater than the thickness of the second insulation layer ILA2 and the thickness of the third insulation layer ILA3, the spacer member CSa may be disposed to overlap the first insulation layer ILA1. That is, the spacer member CSa may be provided on the first part BMa1.

The spacer member CSa may include a light blocking pigment, and may be made of the same material as that of the light blocking member BMa. Furthermore, in some embodiments, the spacer member CSa may be formed integrally with the light blocking member BMa. In this case, the spacer member CSa and the light blocking member BMa may be formed through a photolithography process using a single mask.

For example, when the light blocking member BMa is made of a negative type photosensitive material, the light blocking member BMa and the spacer member CSa may be formed simultaneously using a halftone mask including a light transmitting pattern, a light blocking pattern, a first semitransmitting pattern and a second semitransmitting pattern whose transmittance is lower than that of the first semitransmitting pattern. In this case, the light transmitting pattern may correspond to the spacer member CSa, and the light blocking pattern may correspond to the region outside the light blocking regions BA1, BA2 and BA3. In addition, the first semitransmitting pattern and the second semitransmitting pattern may correspond to the light blocking regions BA1, BA2 and BA3. Specifically, the second semitransmitting pattern may correspond to the boundary regions EAs of the light blocking regions BA1, BA2 and BA3, and the first semitransmitting pattern may correspond to the portions of the light blocking regions BA1, BA2 and BA3 outside the portion corresponding to the second semitransmitting pattern. In this case, the height difference between the third part BMa3 and the first part BMa1, and the height difference between the third part BMa3 and the second part BMa2, may be caused by a transmittance difference between the first semitransmitting pattern and the second semitransmitting pattern. That is, the third part BMa3 may be hardened by a quantity of light which is relatively smaller than that incident to the first part BMa1 and the second part BMa2, thus causing the height difference between the third part BMa3 and the first part BMa1, and the height difference between the third part BMa3 and the second part BMa2.

Since other components are substantially the same or similar as those described with reference to FIG. 5 to FIG. 9, detailed description thereof will be omitted.

Figure 13:
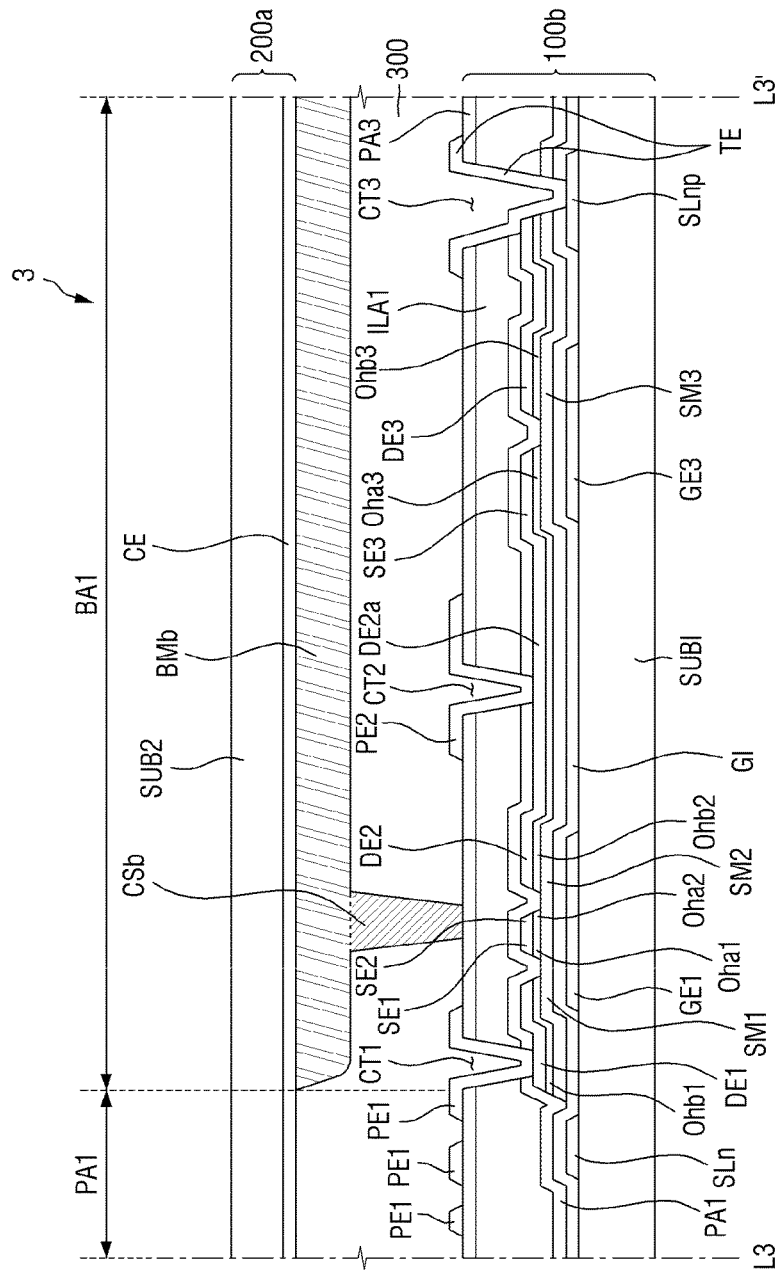
FIG. 13 is a schematic cross sectional view of the display device according to another embodiment of the present inventive concept, taken along line L3-L3' of FIG. 2.
Figure 14:
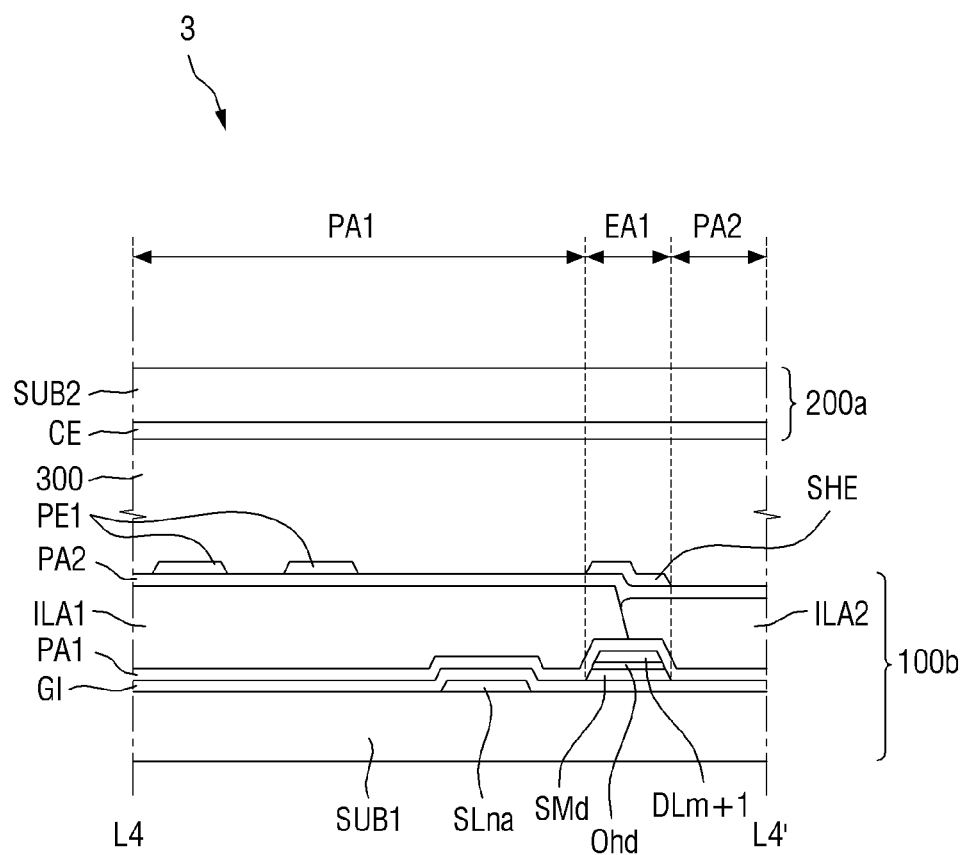
FIG. 14 is a schematic cross sectional view of the display device according to another embodiment of the present inventive concept, taken along line L4-L4' of FIG. 2.

FIG. 13 is a schematic cross sectional view of the display device according to another embodiment of the present inventive concept, taken along line L3-L3' of FIG. 2. FIG. 14 is a schematic cross sectional view of the display device according to another embodiment of the present inventive concept, taken along line L4-L4' of FIG. 2.

Referring to FIG. 13 and FIG. 14, a display device 3 according to the present embodiment may include an array substrate 100b, a counterpart substrate 200a facing the array substrate 100b, and a liquid crystal layer 300 interposed between the array substrate 100b and the counterpart substrate 200a. The display device 3 may further include a pair of polarizers (not shown) attached to outer surfaces of the array substrate 100b and the counterpart substrate 200a.

Unlike the display device 1 described above with reference to FIG. 2 to FIG. 4, the display device 3 according to the present embodiment may include a light blocking member BMb and a spacer member CSb provided on the counterpart substrate 200a.

The array substrate 100b differs from the array substrate 100 described above with reference to FIG. 2 to FIG. 4, in that the former does not include the light blocking member BMb and the spacer member CSb. Other components may be substantially the same. Therefore, detailed description of each such other component will be omitted.

The counterpart substrate 200a may include the second insulation substrate SUB2, the light blocking member BMb and the common electrode CE.

The second insulation substrate SUB2 may be a transparent insulation substrate like the first insulation substrate SUB1.

The common electrode CE may be provided on one surface of the second insulation substrate SUB2 that faces the first insulation substrate SUB1. The common electrode CE may be made of a transparent conductive material such as ITO and IZO.

The light blocking member BMb may be provided on the common electrode CE.

The light blocking member BMb may overlap the first light blocking region BA1 of the first pixel region PA1 of the first insulation substrate SUB1. The light blocking member BMb may cover the gate line GLn and the first, the second and the third thin film transistors Tr1, Tr2 and Tr3. Furthermore, the light blocking member BMb may cover the first contact hole CT1, the second contact hole CT2 and the sustain electrode contact hole CT3. The light blocking member BMb may include a light blocking pigment, for example, black carbon, and/or a photosensitive organic material.

The spacer member CSb may be provided on the light blocking member BMb, and may directly contact the light blocking member BMb. The spacer member CSb may directly contact the array substrate 100b, and may maintain a gap between the array substrate 100b and the counterpart substrate 200a. In some embodiments, the spacer member CSb may include a light blocking pigment, and may be made of the same material as that of the light blocking member BMb. In some embodiments, the spacer member CSb may be formed integrally with the light blocking member BMb, and the spacer member CSb and the light blocking member BMb may be formed simultaneously through a single photolithography process using a slit mask, a halftone mask or the like.

In some embodiments, the spacer member CSb may be arranged to overlap a thin film transistor. In an exemplary embodiment, the spacer member CSb may be arranged to overlap at least one of the first thin film transistor Tr1, the second thin film transistor Tr2 and the third thin film transistor Tr3. Although the spacer member CSb is depicted as overlapping the first thin film transistor Tr1 in the drawings, this is merely an example, and it may alternatively overlap any other transistor or other structure.

Other components may be the same as those described above with reference to FIG. 2 to FIG. 4, and therefore any detailed description thereof will be omitted.

Figure 15:
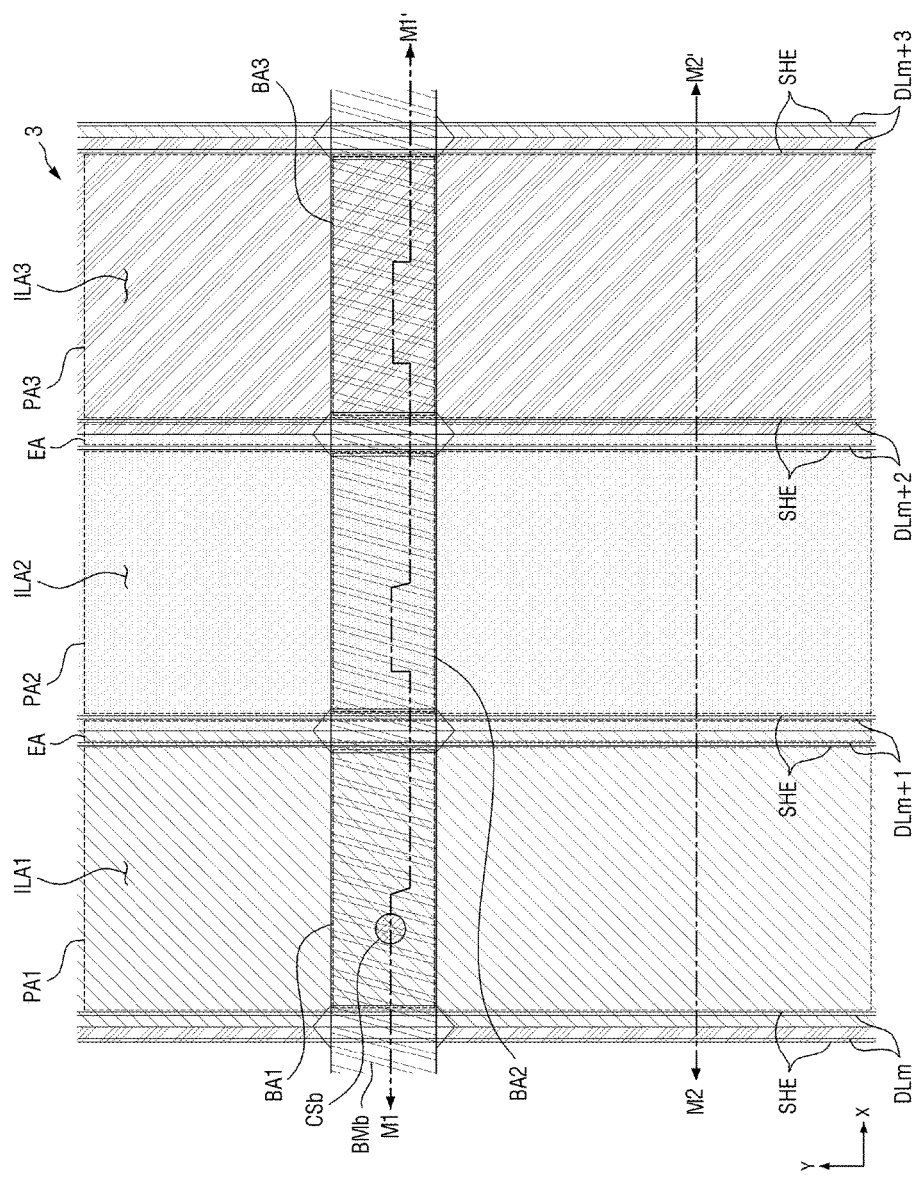
FIG. 15 is a plan view schematically illustrating an exemplary arrangement of insulation layers, a light blocking member, data lines and shield electrodes in the display device according to another embodiment of the present inventive concept.
Figure 16:
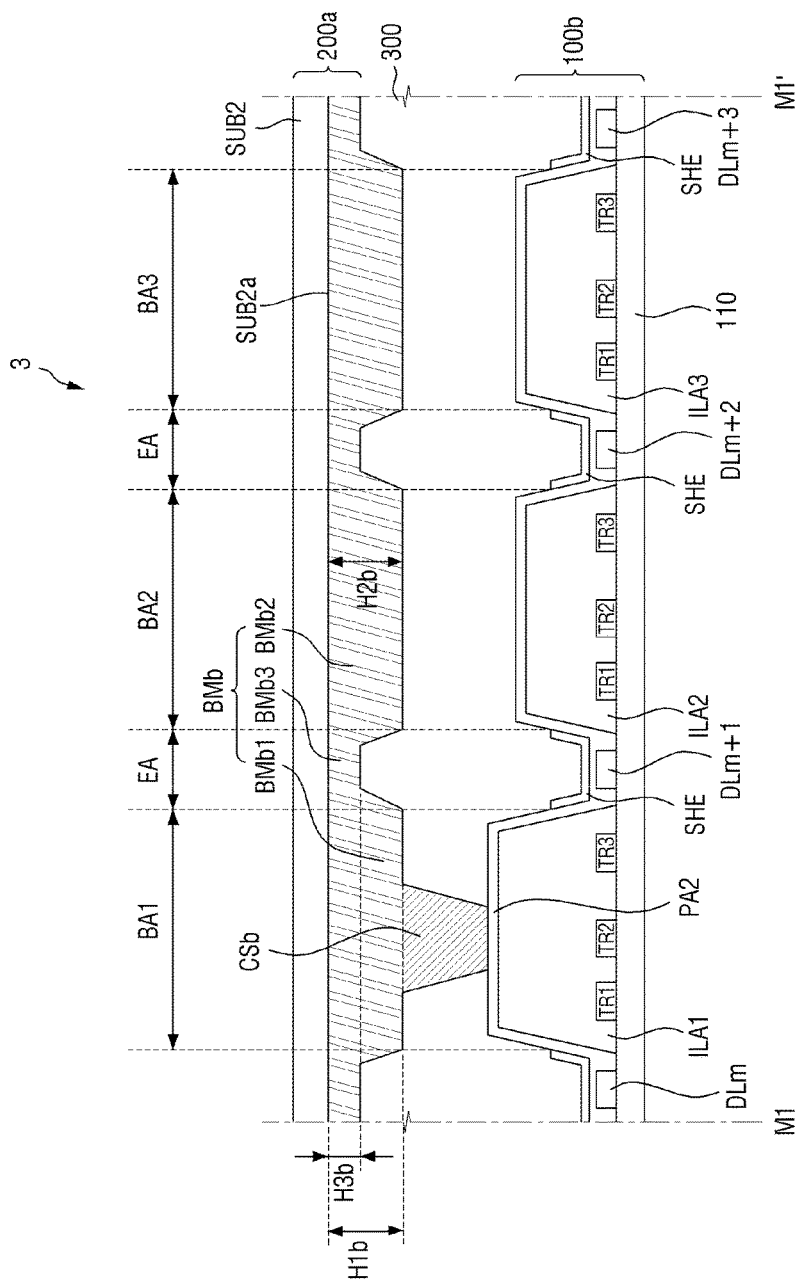
FIG. 16 is a schematic cross sectional view taken along line M1-M1' of FIG. 5 and FIG. 15.
Figure 17:
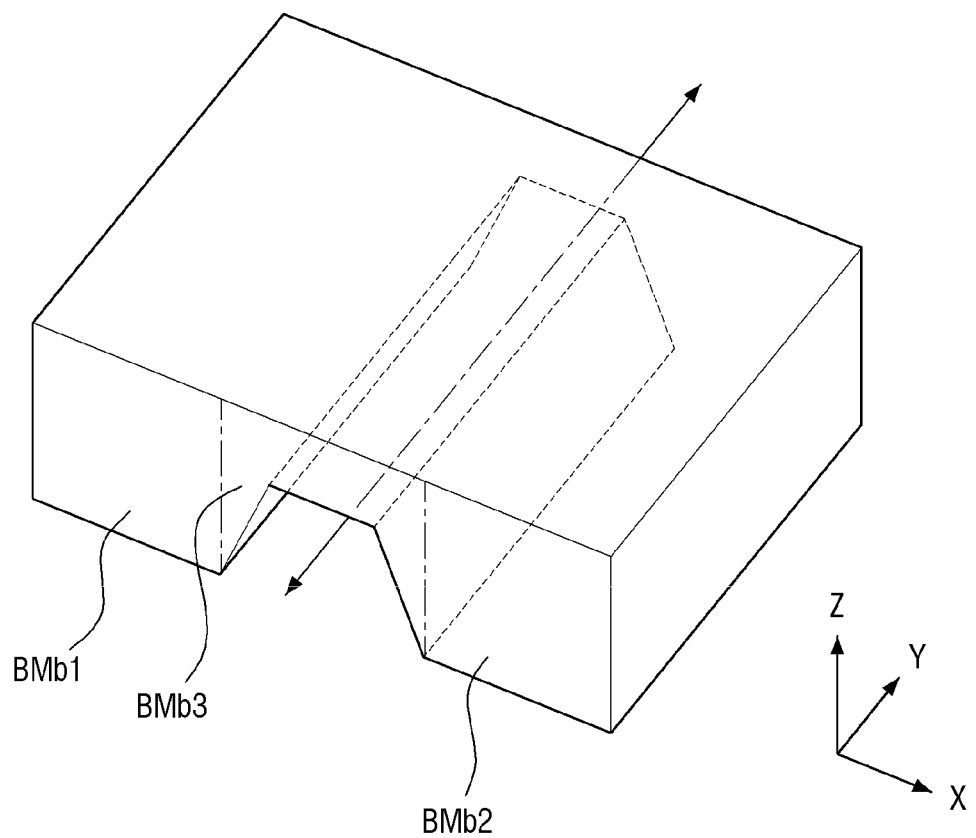
FIG. 17 is an enlarged perspective view illustrating a part of the light blocking member shown in FIG. 16.
Figure 18:
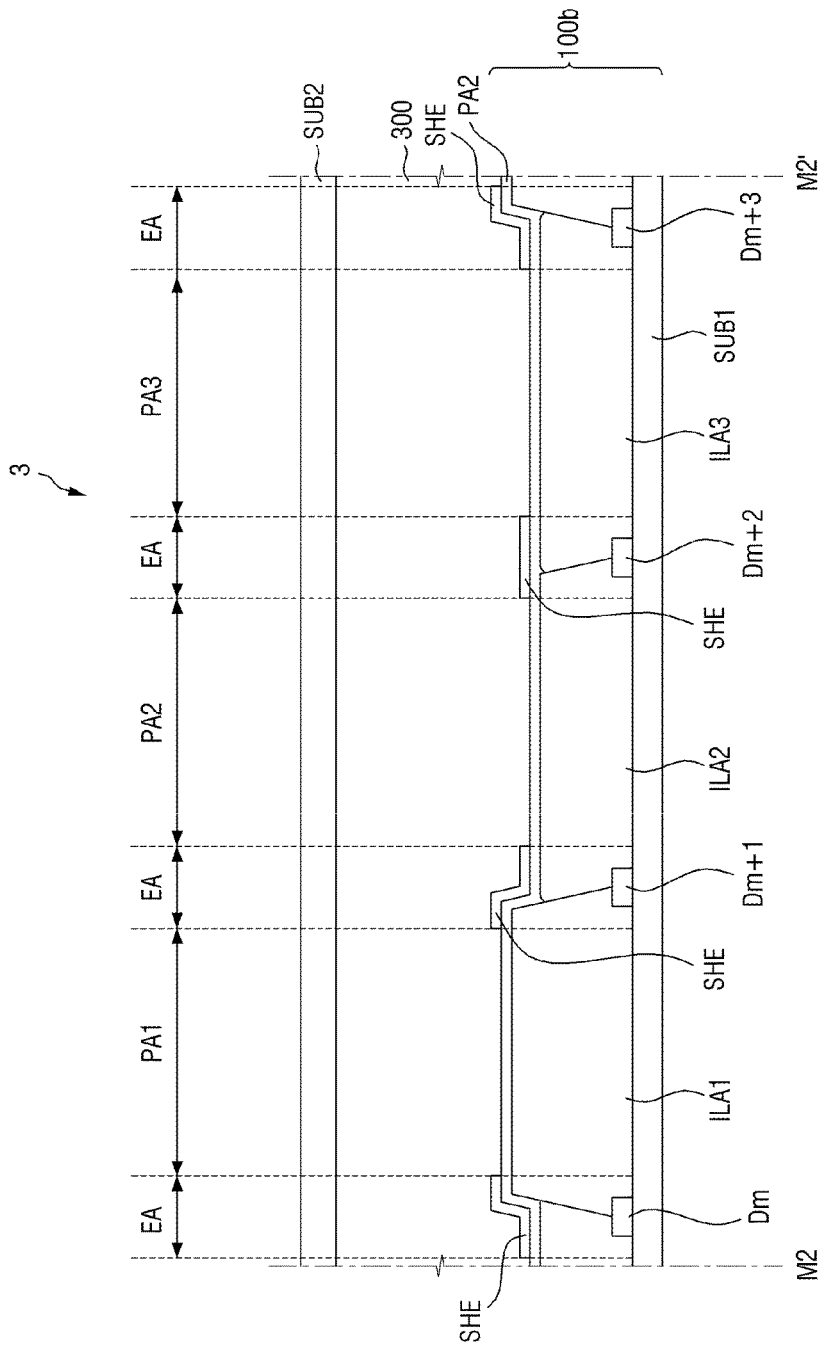
FIG. 18 is a schematic cross sectional view taken along line M2-M2' of FIG. 5 and FIG. 16.

FIG. 15 is a plan view schematically illustrating an exemplary arrangement of insulation layers, a light blocking member, data lines and shield electrodes in the display device according to another embodiment of the present inventive concept. FIG. 16 is a schematic cross sectional view taken along line M1-M1' of FIG. 5 and FIG. 15. FIG. 17 is an enlarged perspective view illustrating a part of the light blocking member shown in FIG. 16. FIG. 18 is a schematic cross sectional view taken along line M2-M2' of FIG. 5 and FIG. 16.

Referring to FIG. 15 to FIG. 18, the array substrate 100b of the display device 3 differs from the array substrate 100 described above with reference to FIG. 5 to FIG. 9, in that the former does not include the light blocking member BMb. Various other components may be substantially the same.

For example, the first pixel region PA1, the second pixel region PA2 and the third pixel region PA3 may be arranged in parallel along the first direction (X direction), and the boundary region EA may be provided between the first pixel region PA1 and the second pixel region PA2 and between the second pixel region PA2 and the third pixel region PA3. The first data line DLm and the second data line DLm+1 may be provided at both longitudinal sides of the first pixel region PA1, the second data line DLm+1 and the third data line DLm+2 may be provided at both longitudinal sides of the second pixel region PA2, and the third data line DLm+2 and the fourth data line DLm+3 may be provided at both longitudinal sides of the third pixel region PA3. In this case, the first data line DLm, the second data line DLm+1, the third data line DLm+2 and the fourth data line DLm+3 may be provided in the respective boundary regions EAs. The shield electrode SHE may be provided above each of the data lines DLm, DLm+1, DLm+2 and DLm+3 with the second passivation layer PA2 interposed therebetween.

The first pixel region PA1 may include the first light blocking region BA1, the second pixel region PA2 may include the second light blocking region BA2, and the third pixel region PA3 may include the third light blocking region BA3.

The first insulation layer ILA1 may be disposed in the first pixel region PA1, the second insulation layer ILA2 may be disposed in the second pixel region PA2, and the third insulation layer ILA3 may be disposed in the third pixel region PA3.

The first insulation layer ILA1 and the second insulation layer ILA2 may be spaced apart from each other in the boundary region EA between the first light blocking region BA1 and the second light blocking region BA2. Similarly, the second insulation layer ILA2 and the third insulation layer ILA3 may be spaced apart from each other in the boundary region EA between the second light blocking region BA2 and the third light blocking region BA3. Alternatively, as shown in FIG. 18, the first insulation layer ILA1 and the second insulation layer ILA2 may partially overlap each other in the boundary region EA between the first pixel region PA1 and the second pixel region PA2. Similarly, the second insulation layer ILA2 and the third insulation layer ILA3 may partially overlap each other in the boundary region EA between the second pixel region PA2 and the third pixel region PA3.

The light blocking member BMb may be provided on one surface of the second insulation substrate SUB2 facing the array substrate 100b. Although not shown in the drawings, a common electrode may be interposed between the light blocking member BMb and the second insulation substrate SUB2 as described above with reference to FIG. 13 and FIG. 14. The light blocking member BMb may overlap or form the first light blocking region BA1, the second light blocking region BA2 and the third light blocking region BA3, and may extend in the first direction (or X direction). In other words, a part of the light blocking member BMb overlaps or forms the first light blocking region BA1, a part of the light blocking member BMb overlaps or forms the second light blocking region BA2, and a part of the light blocking member BMb overlaps or forms the third light blocking region BA3, and each of these parts may be connected with each other.

The part of the light blocking member BMb overlapping the first light blocking region BA1 will be defined as a first part BMb1, the part of the light blocking member BMb overlapping the second light blocking region BA2 will be defined as a second part BMb2, and a part of the light blocking member BMb overlapping the boundary region EA between the first light blocking region BA1 and the second light blocking region BA2 will be defined as a third part BMb3.

The third part BMb3 may have both sides open. More specifically, as shown in FIG. 16, both sides of the third part BMb3 may open in the second direction (or Y direction), so that a channel or depression is formed between first part BMb1 and second part BMb2.

When the minimum height from one surface SUB2a of the second insulation substrate SUB2 to an upper surface of the first part BMb1 is referred to as a first height H1b, the minimum height from one surface SUB2a of the second insulation substrate SUB2 to an upper surface of the second part BMb2 is referred to as a second height H2b, and the minimum height from one surface SUB2a of the second insulation substrate SUB2 to an upper surface of the third part BMb3 is referred to as a third height H3b, the third height H3b may be lower than each of the first height H1b and the second height H2b. In some embodiments, the first height H1b and the second height H2b may be the same. In another embodiment, the first height H1b and the second height H2b may be different from each other. In some embodiments, when the first insulation layer ILA1 is formed to have a thickness greater than the thickness of the second insulation layer ILA2 and the thickness of the third insulation layer ILA3, the first height H1b may be greater than the second height H2b.

The spacer member CSb may be provided on the light blocking member BMb. In some embodiments, when the thickness of the first insulation layer ILA1 is greater than the thickness of the second insulation layer ILA2 and the thickness of the third insulation layer ILA3, the spacer member CSb may be disposed to overlap the first insulation layer ILA1. That is, the spacer member CSb may be disposed on the first part BMb1, and in this case, the second part BMb2 may act as an auxiliary spacer member. Furthermore, the spacer member CSb may be disposed on the first part BMb1, which is relatively thick, and may overlap the first insulation layer ILA1, thereby reducing the thickness of the spacer member CSb itself.

The spacer member CSb may include a light blocking pigment, and may be made of the same material as that of the light blocking member BMb. Furthermore, in some embodiments, the spacer member CSb may be formed integrally with the light blocking member BMb. In this case, the spacer member CSb and the light blocking member BMb may be formed through a photolithography process using a single mask.

In an exemplary embodiment, when the light blocking member BMb is made of a negative type photosensitive material, the light blocking member BMb and the spacer member CSb may be formed simultaneously using a halftone mask including a light transmitting pattern, a light blocking pattern, a first semitransmitting pattern and a second semitransmitting pattern whose transmittance is lower than that of the first semitransmitting pattern. In this case, the light transmitting pattern may correspond to the spacer member CSb, and the light blocking pattern may correspond to the region outside the light blocking regions BA1, BA2 and BA3. In addition, the second semitransmitting pattern may correspond to the third part BMb3, and the first semitransmitting pattern may correspond to a portion of the first part BMb1 which does not overlap the spacer member CSb as well as to the second part BMb2. The third part BMb3 may be hardened by a quantity of light less than that incident to the first part BMb1 and the second part BMb2, thus causing a height difference between the third part BMb3 and the first part BMb1 and a height difference between the third part BMb3 and the second part BMb2.

Since other components are substantially the same or similar as those described with reference to FIG. 5 to FIG. 9, detailed description thereof will be omitted.

Figure 19:
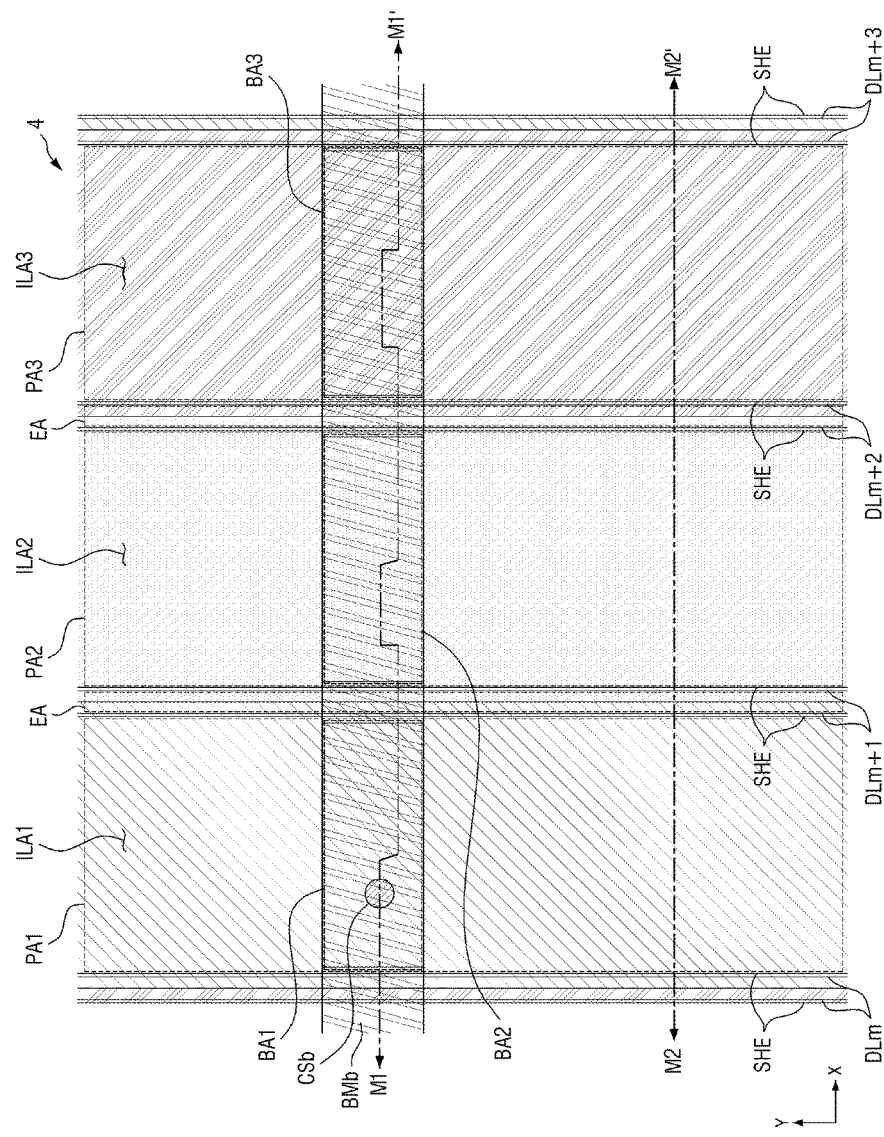
FIG. 19 is a plan view of a modified embodiment of the display device shown in FIG. 15, schematically illustrating another exemplary arrangement of insulation layers, a light blocking member, data lines and shield electrodes in the display device.
Figure 20:
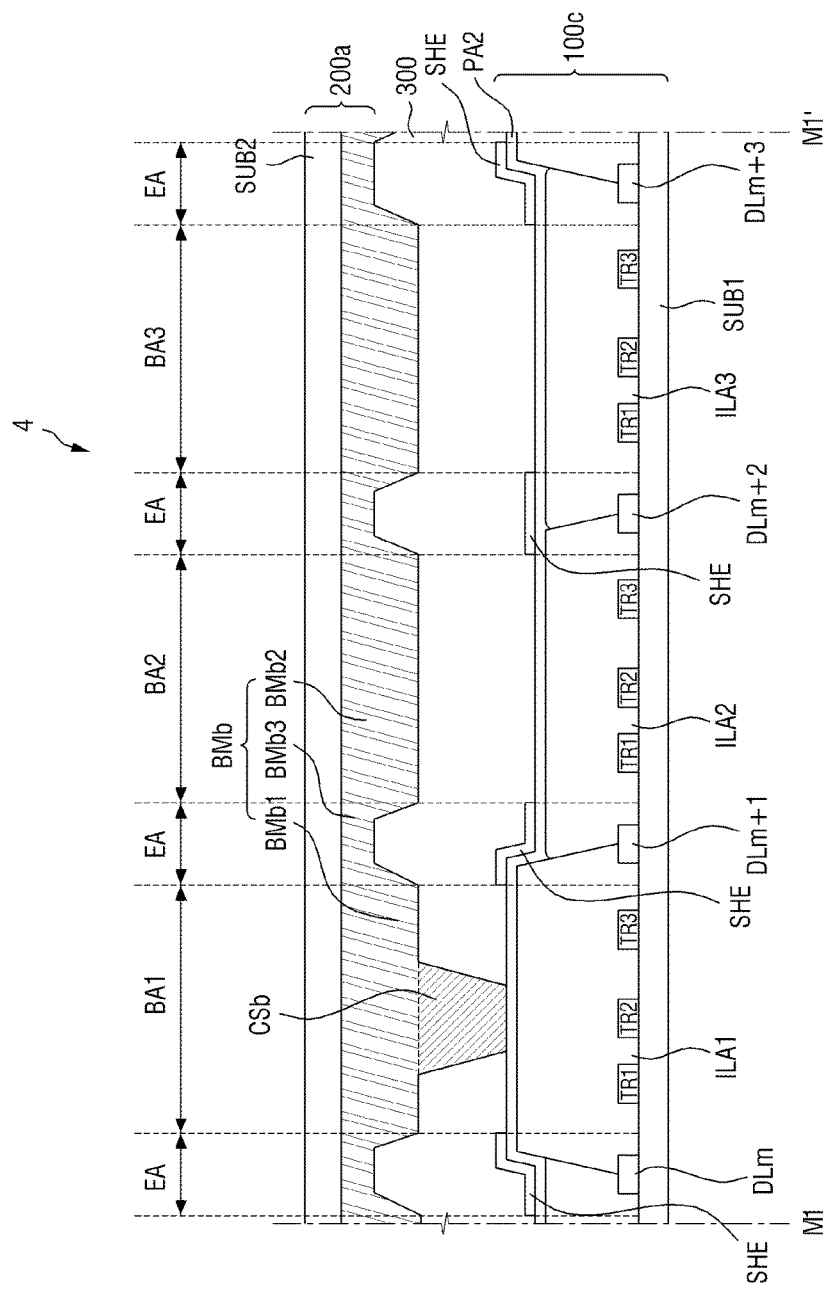
FIG. 20 is a schematic cross sectional view taken along line M1-M1' of FIG. 5 and FIG. 19.
Figure 21:
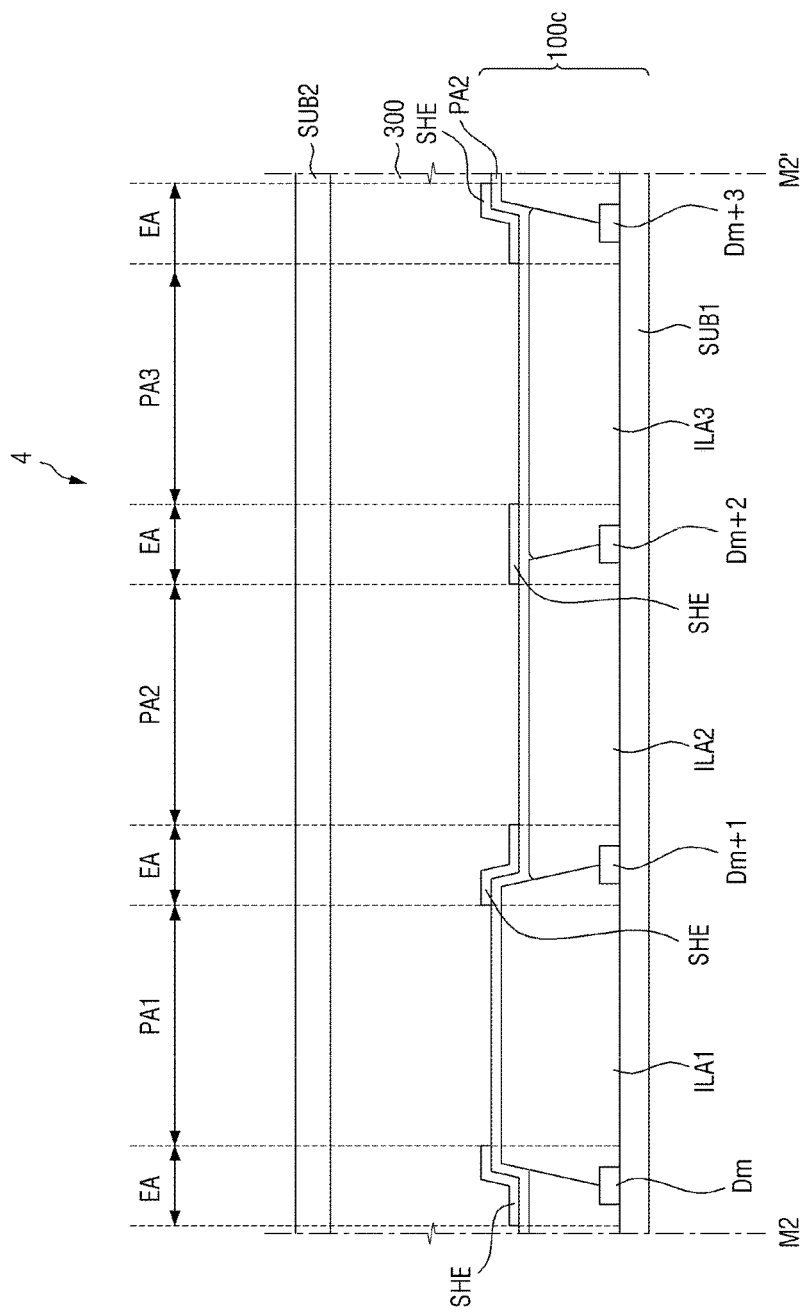
FIG. 21 is a schematic cross sectional view taken along line M2-M2' of FIG. 5 and FIG. 19.

FIG. 19 is a plan view of a modified embodiment of the display device shown in FIG. 15, schematically illustrating another exemplary arrangement of insulation layers, a light blocking member, data lines and shield electrodes in the display device. FIG. 20 is a schematic cross sectional view taken along line M1-M1' of FIG. 19. FIG. 21 is a schematic cross sectional view taken along line M2-M2' of FIG. 5 and FIG. 19.

Referring to FIG. 19 to FIG. 21, an array substrate 100c of a display device 4 of the present embodiment differs from the array substrate 100a described above with reference to FIG. 10 to FIG. 12, in that the light blocking member BMb is not disposed in the array substrate 100c. Various other components may be substantially the same.

The first insulation layer ILA1 and the second insulation layer ILA2 may partially overlap each other in the boundary region EA between the first light blocking region BA1 and the second light blocking region BA2. Similarly, the second insulation layer ILA2 and the third insulation layer ILA3 may partially overlap each other in the boundary region EA between the second light blocking region BA2 and the third light blocking region BA3. Furthermore, as shown in FIG. 20, the first insulation layer ILA1 and the second insulation layer ILA2 may partially overlap each other in the boundary region EA outside the first light blocking region BA1 and the second light blocking region BA2. Similarly, the second insulation layer ILA2 and the third insulation layer ILA3 may partially overlap each other in the boundary region EA outside the second light blocking region BA2 and the third light blocking region BA3.

The light blocking member BMb may be the same as those described above with reference to FIG. 15 to FIG. 18. Specifically, the light blocking member BMb may include a first part BMb1 overlapping or forming the first light blocking region BA1, a second part BMb2 overlapping or forming the second light blocking region BA2, and a third part BMb3 overlapping the boundary region EA between the first light blocking region BA1 and the second light blocking region BA2. In the present embodiment, the first part BMb1 of the light blocking member BMb may overlap the first insulation layer ILA1, the second part BMb2 of the light blocking member BMb may overlap the second insulation layer ILA2, and the third part BMb3 of the light blocking member BMb may overlap the area containing boh the first insulation layer ILA1 and the second insulation layer ILA2.

Since other components are substantially the same or similar with those described with reference to FIG. 10 to FIG. 12 and FIG. 15 to FIG. 18, detailed description thereof will be omitted.

While the present inventive concept has been particularly shown and described with reference to exemplary embodiments thereof, these are merely examples and the present disclosure is not limited thereto. It will be understood by those of ordinary skill in the art that various changes in form and details may be made therein without departing from the spirit and scope of the present inventive concept as defined by the following claims. For example, each component described in the embodiments of the present disclosure can be modified. Furthermore, differences related to the modifications and applications should be understood as being included in the scope of the present inventive concept defined in the appended claims. Various features of the above described and other embodiments can be mixed and matched in any manner, to produce further embodiments consistent with the invention.

What is claimed is:

1. A display device comprising:
an array substrate including a data line;
a counterpart substrate facing the array substrate; and
a liquid crystal layer interposed between the array substrate and the counterpart substrate;
wherein the array substrate includes:
a first insulation substrate including a first pixel region having a first light blocking region, a second pixel region disposed adjacent to the first pixel region in a first direction and having a second light blocking region, and a boundary region disposed between the first pixel region and the second pixel region;
a first insulation layer disposed on the first light blocking region of the first insulation substrate;
a second insulation layer disposed on the second light blocking region of the first insulation substrate;
a light blocking member including a first part disposed on the first light blocking region of the first insulation substrate and on the first insulation layer, a second part disposed on the second light blocking region of the first insulation substrate and on the second insulation layer, and a third part disposed on the boundary region of the first insulation substrate, the third part being connected to the first part and the second part and overlapping the data line; and
a spacer member disposed on the light blocking member and contacting the counterpart substrate, and
wherein a minimum height from an upper surface of the first insulation substrate to an upper surface of the third part is lower than a minimum height from the upper surface of the first insulation substrate to an upper surface of the first part and lower than a minimum height from the upper surface of the first insulation substrate to an upper surface of the second part,
wherein the first insulation layer and the second insulation layer are spaced apart from each other at the boundary region, and the third part is disposed in a space between the first insulation layer and the second insulation layer,
wherein each of the first insulation layer and the second insulation layer does not overlap the data line,
wherein the minimum height from the upper surface of the first insulation substrate to the upper surface of the first part is higher than the minimum height from the upper surface of the first insulation substrate to the upper surface of the second part, and
wherein the spacer member is disposed on the first part.

2. The display device of claim 1, wherein the spacer member includes a light blocking pigment.

3. The display device of claim 2, wherein the spacer member is formed integrally with the light blocking member.

4. The display device of claim 1, wherein the first part is disposed at one side of the third part, and the second part is disposed at an opposing side of the third part.

5. The display device of claim 1, wherein the third part forms a channel extending in a second direction intersecting the first direction.

6. The display device of claim 1, wherein the first insulation layer includes a first color pigment, and the second insulation layer includes a second color pigment different from the first color pigment.

7. The display device of claim 6, wherein the first color pigment is a blue pigment.

8. The display device of claim 1, wherein the array substrate further includes a thin film transistor disposed in the first light blocking region of the first insulation substrate, and the spacer member overlaps the thin film transistor.

9. A display device comprising:
an array substrate including a data line;
a counterpart substrate facing the array substrate; and
a liquid crystal layer interposed between the array substrate and the counterpart substrate;
wherein the array substrate includes a first insulation substrate having a first pixel region having a first light blocking region, a second pixel region disposed adjacent to the first pixel region in a first direction and having a second light blocking region, and a boundary region disposed between the first pixel region and the second pixel region;
the counterpart substrate includes:
a second insulation substrate;
a light blocking member disposed on the second insulation substrate facing the array substrate, and overlapping the first light blocking region and the second light blocking region; and
a spacer member which is disposed on the light blocking member and which contacts the array substrate;
wherein the light blocking member includes a first part, a second part different from the first part, and a third part different from the first part and the second part, the third part overlapping the data line,
wherein a minimum height from one surface of the second insulation substrate to an upper surface of the third part is lower than a minimum height from the one surface of the second insulation substrate to an upper surface of the first part and lower than a minimum height from the one surface of the second insulation substrate to an upper surface of the second part,
wherein the array substrate further includes a first insulation layer disposed on the first light blocking region of the first insulation substrate and overlapping the first part, and a second insulation layer disposed on the second light blocking region of the first insulation substrate and overlapping the second part, and the third part overlapping the boundary region,
wherein each of the first insulation layer and the second insulation layer does not overlap the data line,
wherein the minimum height from the one surface of the second insulation substrate to the upper surface of the first part is higher than the minimum height from the one surface of the second insulation substrate to the upper surface of the second part, and
wherein the spacer member is disposed on the first part.

10. The display device of claim 9, wherein the first part is disposed at one side of the third part, and the second part is disposed at an opposing side of the third part.

11. The display device of claim 9, the third part forms a channel extending in a second direction intersecting the first direction.

12. The display device of claim 9, wherein the spacer member includes a light blocking pigment.

13. The display device of claim 12, wherein the spacer member is formed integrally with the light blocking member.

14. The display device of claim 9, wherein the first insulation layer includes a first color pigment, and the second insulation layer includes a second color pigment different from the first color pigment.

15. The display device of claim 14, wherein the first color pigment is a blue pigment.

* * * * *